(12) United States Patent
Komori

(10) Patent No.: US 7,687,951 B2
(45) Date of Patent: Mar. 30, 2010

(54) FLUID DYNAMIC BEARING DEVICE AND MOTOR EQUIPPED WITH THE SAME

(75) Inventor: Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 478 days.

(21) Appl. No.: 11/660,739

(22) PCT Filed: Jun. 21, 2006

(86) PCT No.: PCT/JP2006/012430

§ 371 (c)(1),
(2), (4) Date: Feb. 22, 2007

(87) PCT Pub. No.: WO2007/000925

PCT Pub. Date: Jan. 4, 2007

(65) Prior Publication Data
US 2007/0252461 A1 Nov. 1, 2007

(30) Foreign Application Priority Data
Jun. 27, 2005 (JP) ............................. 2005-186538
Jul. 20, 2005 (JP) ............................. 2005-210332

(51) Int. Cl.
H02K 5/16 (2006.01)
H02K 7/08 (2006.01)
(52) U.S. Cl. ........................................ 310/90; 384/107
(58) Field of Classification Search .................. 310/90; 384/107
See application file for complete search history.

(56) References Cited
U.S. PATENT DOCUMENTS
5,678,929 A * 10/1997 Parsoneault et al. ......... 384/112

6,338,574 B1 * 1/2002 Shimizu et al. ............. 384/115
6,554,474 B2 * 4/2003 Saito et al. .................. 384/107

(Continued)

FOREIGN PATENT DOCUMENTS
CN 1419058 A 5/2003

(Continued)

OTHER PUBLICATIONS
International Search Report of PCT/JP2006/312430, date of mailing Sep. 12, 2006.

(Continued)

*Primary Examiner*—Quyen Leung
*Assistant Examiner*—Alex W Mok
(74) *Attorney, Agent, or Firm*—Westerman, Hattori, Daniels & Adrian, LLP

(57) ABSTRACT

Disclosed is an inexpensive fluid dynamic bearing device exhibiting high bearing performance and long life. A fluid dynamic bearing device (1) is mainly composed of a shaft member (2), and a bearing member (7) equipped with a cylindrical radial bearing surface (A) opposed to an outer peripheral surface (2a) of the shaft member (2). The bearing member (7) is formed by injection molding with an electroformed portion (10) inserted, and the radial bearing surface (A) is formed on the electroformed portion (10). Further, a thrust bearing surface (B) is formed on an upper end surface (7b) of the bearing member (7), and the shaft member (2) is supported in a thrust direction by a dynamic pressure action of a lubricating fluid generated in a thrust bearing gap opposed to the thrust bearing surface (B).

7 Claims, 15 Drawing Sheets

U.S. PATENT DOCUMENTS

2003/0091250 A1    5/2003  Gomyo
2003/0190100 A1 * 10/2003  Grantz et al. ............... 384/119
2006/0051001 A1 *  3/2006  Nishimura et al. .......... 384/100

FOREIGN PATENT DOCUMENTS

| JP | 09316666 A | * | 12/1997 |
| JP | 2002-276649 A | | 9/2002 |
| JP | 2003-56552 A | | 2/2003 |
| JP | 2003-314534 A | | 11/2003 |
| JP | 2005-155911 A | | 6/2005 |
| WO | WO 2004/092600 A1 | | 10/2004 |

OTHER PUBLICATIONS

Chinese Office Action dated Jul. 18, 2008, issued in corresponding Chinese Patent Application No. 200680000852.4.

* cited by examiner

FLUID DYNAMIC BEARING DEVICE AND MOTOR EQUIPPED WITH THE SAME

BACKGROUND OF THE INVENTION

1. Field of the Invention

The present invention relates to a fluid dynamic bearing device and a motor equipped with the same.

2. Description of the Related Art

A fluid dynamic bearing device rotatably supports a shaft member by means of a fluid film formed in a bearing gap. Such fluid dynamic bearing devices are roughly classified into ones equipped with a dynamic pressure generating portion for generating dynamic pressure in a lubricating fluid in the bearing gap (so-called dynamic pressure bearings), and ones equipped with no dynamic pressure generating portion. Both types exhibit superior characteristics in terms of high speed rotation, high rotational precision, low noise, etc. In view of those characteristics, a fluid dynamic bearing device is widely suitable for use in, apart from a fan motor mounted in a personal computer (PC), etc., small motors for information apparatuses, for example, a spindle motor mounted in a magnetic disk apparatus such as an HDD and an FDD, an optical disk apparatus such as a CD-ROM, CD-R/RW, and DVD-ROM/RAM, and a magneto-optical disk apparatus such as an MD and an MO, and a polygon scanner motor mounted in a laser beam printer (LBP) or the like.

For example, in a fluid dynamic bearing device for a fan motor, which is among the various motors mentioned above, a rotor with vanes is supported radially by a radial bearing portion so as to be rotatable. Further, a reaction force (thrust force) of the blowing action generated by the vanes is supported by an axial component of a magnetic force generated between a stator coil and a rotor magnet, and a thrust load due to a difference between the magnetic force and the thrust force is supported by a thrust bearing portion. In many cases, in a bearing device for a fan motor, a dynamic pressure bearing is adopted as the radial bearing portion, and a so-called pivot bearing in which the axial end of a rotation shaft is held in contact with a receiving member, is adopted as the thrust bearing portion (see, for example, JP 2000-46057 A).

As an example of a fluid dynamic bearing device for a spindle motor, a structure as shown in FIG. 25 is known. In this fluid dynamic bearing device, there is provided, between the outer peripheral surface of a shaft member 100 and the inner peripheral surface of a bearing member 200 opposed thereto through the intermediation of a radial bearing gap, a radial bearing portion 400 supporting the shaft member 100 radially in a non-contact fashion. Further, there are provided, between the end surfaces of a flange portion 110 provided on the shaft member 100 and members opposed thereto through the intermediation of thrust bearing gaps (bearing member 200 and cover member 300), thrust bearing portions 500 supporting the shaft member in the thrust direction in a non-contact fashion.

In recent years, in particular, in information apparatuses with disk apparatuses incorporated therein, with the rapid progress in performance, a reduction in size and thickness is also being aimed at, and there is an increasingly strict demand for a reduction in the size of a fluid dynamic bearing device. However, in the fluid dynamic bearing device construction as shown in FIG. 25, in which the radial bearing portion and the two thrust bearing portions are stacked together in the axial direction, the axial dimension of the bearing device is generally large, and there are limitations in a reduction in size.

In view of this, there has been disclosed, for example, a construction in which the shaft member is formed in a truncated-cone-like configuration, with a bearing member of a sintered metal being arranged in the outer periphery thereof; there is formed between the shaft member and the bearing member a bearing gap (inclined bearing gap) whose diameter is large on one axial side and small on the other axial side, and a thrust bearing gap is formed between an end surface of the shaft member and a closing member opposed thereto. With this construction, there is no need to provide the flange portion 110 of the shaft member 100 shown in FIG. 25, so it is possible to make the axial dimension of the bearing device so much the smaller (see, for example, JP 2002-276649 A).

In the fluid dynamic bearing device disclosed in JP 2000-46057 A, grooves (dynamic pressure generating portions) for generating fluid dynamic pressure in the radial bearing gap is formed simultaneously with the formation of the bearing member. In this system, however, it is rather difficult to secure a sufficient degree of precision for the dynamic pressure generating portions. Further, since the thrust bearing portions are formed by pivot bearings, wear due to long-term use of the bearing device is inevitable, and there is a fear of this wear adversely affecting the rotational accuracy. Further, the pivot bearing is disadvantageous also from the viewpoint of securing the requisite load capacity (moment rigidity) with respect to moment load.

In the fluid dynamic bearing device disclosed in JP 2002-276649 A, in order to form the inclined bearing gap, it is necessary to form the outer peripheral surface of the shaft member and the inner peripheral surface of the bearing member as conical surfaces. However, it is by no means easy to form the conical surfaces by machining accurately and efficiently. In particular, as compared with the outer peripheral surface, the inner peripheral surface is more difficult to form, so, with the current state of the art, it is rather difficult to finish the conical inner peripheral surface of the bearing member with high accuracy and at low cost; thus, it goes without saying that it is very difficult to secure the requisite precision for the dynamic pressure generating portions when providing the dynamic pressure generating portions such as dynamic pressure grooves, in the conical inner peripheral surface of the bearing member. The bearing performance of a fluid dynamic bearing device, including rotational accuracy, greatly depends on the precision of the bearing gap. Thus, it is impossible to obtain in a stable manner a high precision bearing gap, so a satisfactory bearing performance may not be attained depending upon the design condition, etc.

SUMMARY OF THE INVENTION

It is a first object of the present invention to provide at low cost a fluid dynamic bearing device exhibiting high bearing performance and long life.

A second object of the present invention is to provide at low cost a fluid dynamic bearing device equipped with a high precision inclined bearing gap and exhibiting high bearing performance.

To achieve the first object, according to the present invention, there is provided a fluid dynamic bearing device, including: a shaft member; a cylindrical radial bearing surface opposed to an outer peripheral surface of the shaft member; a bearing member formed by injection molding with an electroformed portion inserted, the electroformed portion having a radial bearing surface; and a thrust bearing portion equipped with a thrust bearing surface formed on an end surface of the bearing member and a thrust bearing gap facing the thrust bearing surface, in which the shaft member is supported in a thrust direction by a dynamic pressure action of a lubricating fluid generated in the thrust bearing gap. The radial bearing surface and the thrust bearing surface described herein represent the surface facing the radial bearing gap and the thrust bearing gap. It does not matter whether or not dynamic pressure generating portions such as dynamic grooves are formed in those surfaces.

In the above-mentioned construction, the bearing member is formed by injection molding with the electroformed portion inserted, so, as compared with a case in which two or more members (e.g., sleeve and housing) are fixed together by adhesion or the like, the assembly process is simplified, and a reduction in cost is achieved; further, an enhancement in precision can be achieved.

Further, when, as in the present invention, the thrust bearing portion is formed by a dynamic pressure bearing, it is possible to avoid a deterioration in rotational accuracy due to wear, which is a problem involved when it is formed by a pivot bearing. Further, in a dynamic pressure bearing, the thrust bearing portion effects not point supporting, as in a case of a pivot bearing, but surface supporting, so it is possible to enlarge the support area in the thrust bearing portion, and to form the thrust bearing portion on the outer side of the radial bearing portion. Thus, it is possible to achieve an enhancement in bearing rigidity and moment rigidity.

The electroformed portion is a metal layer deposited on the surface of a master through electroforming; it can be formed by a method based on electrolytic plating (electroplating) or non-electrolytic plating (chemical plating). Due to the characteristics of electroforming, the surface precision of the electroformed portion, in particular, the surface precision on the side where deposition starts, is such that there is obtained a dense surface to which the surface configuration of the master used in forming the electroformed portion is accurately transferred on the order of microns. Thus, by enhancing the surface precision of the master, it is possible to finish the surface of the electroformed portion with high precision. In the present invention, the above-mentioned characteristics are utilized to form the radial bearing surface of the bearing member as an electroformed portion, so it is possible to control, in particular, the rotational accuracy of the radial bearing portion with high precision.

The thrust bearing gap is formed, for example, between the end surface of a flange portion provided on the shaft member and the thrust bearing surface. Examples of a member corresponding to this flange portion include a member having a rotor magnet mounting portion. This member is also referred to as rotor, and constitutes an indispensable component of a motor, so, by using this member as the member for forming the thrust bearing gap, it is possible to achieve a reduction in the number of parts and the number of assembly steps and a reduction in cost as compared with a case in which a separate member is incorporated into the bearing device in order to form the thrust bearing gap.

It is also possible to form the shaft member as one having two different outer diameters, and to form the thrust bearing gap between a step surface connecting two outer peripheral surfaces of different outer diameters and the thrust bearing surface of the bearing member. In this case, the outer peripheral surface and the step surface of the shaft member face the radial bearing gap and the thrust bearing gap, respectively, so it is possible to control the perpendicularity between the radial bearing gap and the thrust bearing gap easily and with high accuracy, thereby making it possible to achieve an enhancement in rotational accuracy. Further, in this case, it is also possible to provide, for example, between the outer peripheral surface of the shaft member and the bearing member a seal space for preventing leakage of a lubricating fluid filling the interior of the bearing.

It is possible to form on the thrust bearing surface of the bearing member a dynamic pressure generating portion for generating fluid pressure in the thrust bearing gap. In this case, the dynamic pressure generating portion can be formed by molding simultaneously with the injection molding of the bearing member, so it is possible to omit the time and effort for separately forming the dynamic pressure generating portion, thereby achieving a further reduction in the cost of a fluid dynamic bearing device.

It is also possible to form not only the radial bearing surface but also the thrust bearing surface as an electroformed portion. In this case, the electroformed portions are composed of a radial electroformed portion having the radial bearing surface and a thrust electroformed portion integral with or separate from the radial electroformed portion and having the thrust bearing surface. By thus forming also the thrust bearing surface as an electroformed portion, it is possible, due to the above-mentioned characteristics of electroforming, to attain high rotation accuracy also in the thrust bearing portion.

Further, to achieve the second object, according to the present invention, there is provided a fluid dynamic bearing device, including: a shaft member; a bearing member into an inner periphery of which the shaft member is inserted; and an inclined bearing gap formed between an outer peripheral surface of the shaft member and an inner peripheral surface of the bearing member and axially inclined, with the shaft member being rotatably supported by a fluid film formed in the inclined bearing gap, in which the bearing member is provided with an electroformed portion facing the inclined bearing gap and is formed by injection molding with the electroformed portion inserted.

As described above, due to the characteristics of electroforming, the deposition start side surface of the electroformed portion is a dense surface to which the surface configuration of a master is accurately transferred on the order of microns. Thus, when the outer peripheral surface of the master is formed as a conical surface corresponding to the inner peripheral surface configuration of the electroformed portion, and elaborate finishing is performed thereon to sufficiently enhance the precision thereof, it is possible to obtain with high precision a conical inner peripheral surface, which is difficult to form by the conventional machining method. As compared with an inner peripheral surface, an outer peripheral surface is generally easy to form by machining with high precision, so it is not so difficult to finish the outer peripheral surface of the master as a conical surface with high precision. Thus, by forming the electroformed portion so as to face the inclined bearing gap, it is possible to obtain with high precision and at low cost an inclined bearing gap whose diameter is large on one axial side and small on the other axial side.

Since the bearing member can be formed by injection molding (insert molding) with the above-mentioned electroformed portion inserted, it is possible to simplify the assembly process to achieve a reduction in cost and an enhancement in precision.

In the above-mentioned construction, by forming the dynamic pressure generating portion opposed to the inclined bearing gap on one of the outer peripheral surface of the shaft member or the electroformed portion of the bearing member, it is possible to generate fluid dynamic pressure in the inclined bearing gap to achieve an improvement in terms of bearing rigidity. When forming the dynamic pressure generating portion on the electroformed portion of the bearing member, due to the characteristics of electroforming, it is possible to produce the dynamic pressure generating portion with high precision and at low cost by forming in the master a pattern corresponding to the configuration of the dynamic pressure generating portion. On the other hand, when forming the dynamic pressure generating portion on the outer peripheral surface of the shaft member, the outer peripheral surface of the master is formed as a smoothed surface free from surface asperities. The electroformed portion is formed by using this maser, and after separating the electroformed portion from the master, the shaft member with the dynamic pressure generating portion previously formed on the outer peripheral surface thereof is inserted into the inner periphery of the electroformed portion, whereby the bearing device is assembled.

The dynamic pressure generating portion described above can assume various well-known forms as long as it can generate fluid dynamic pressure in the bearing gaps (radial bearing gap, thrust bearing gap, and inclined bearing gap). Examples of the dynamic pressure generating portion generating fluid dynamic pressure in the radial bearing gap and the inclined bearing gap include a plurality of dynamic pressure grooves arranged in a herringbone configuration, a spiral configuration, etc., axial grooves provided at equal circumferential intervals, and a plurality of arcuate surfaces, harmonic waveform surfaces, etc. provided in the circumferential direction. Examples of the dynamic pressure generating portion generating fluid dynamic pressure in the thrust bearing gap include a plurality of dynamic pressure grooves arranged in a herringbone configuration, a spiral configuration, or radially.

The fluid dynamic bearing device, constructed as described above, can be suitably used in a motor having a rotor magnet and a stator coil. In particular, the fluid dynamic bearing device of the present invention obtained in order to achieve the first object has the above-mentioned characteristics, so it is suitable for use as a bearing for a fan motor. In this case, it is possible, for example, to adopt a construction in which the reaction force (thrust) of the blowing action generated by the vanes and a magnetic force in the axially opposite direction are caused to be exerted between the rotor magnet and the stator coil, with the thrust load due to the difference between the reaction force and the magnetic force being supported by the thrust bearing portion. The magnetic force in the direction opposite to the thrust can also be provided by a magnetic attraction force generated between a back yoke (magnetic member) arranged on the outer side of the rotor magnet and the rotor magnet.

The fluid dynamic bearing device of the present invention obtained in order to achieve the second object is suitable for use as a bearing, in particular, in a motor of which there is an urgent demand for a reduction in size, for example, a spindle motor for information apparatus.

As described above, according to the present invention, it is possible to achieve a reduction in the cost of a fluid dynamic bearing device through a reduction in the number of components and the number of assembly steps. Further, it is possible to provide a fluid dynamic bearing device having high bearing performance and long life.

According to the present invention, it is possible to provide at low cost a fluid dynamic bearing device equipped with a high precision inclined bearing gap and having high bearing performance.

DESCRIPTION OF THE PREFERRED EMBODIMENTS

In the following, embodiments of the present invention will be described with reference to the drawings.

Figure 1:
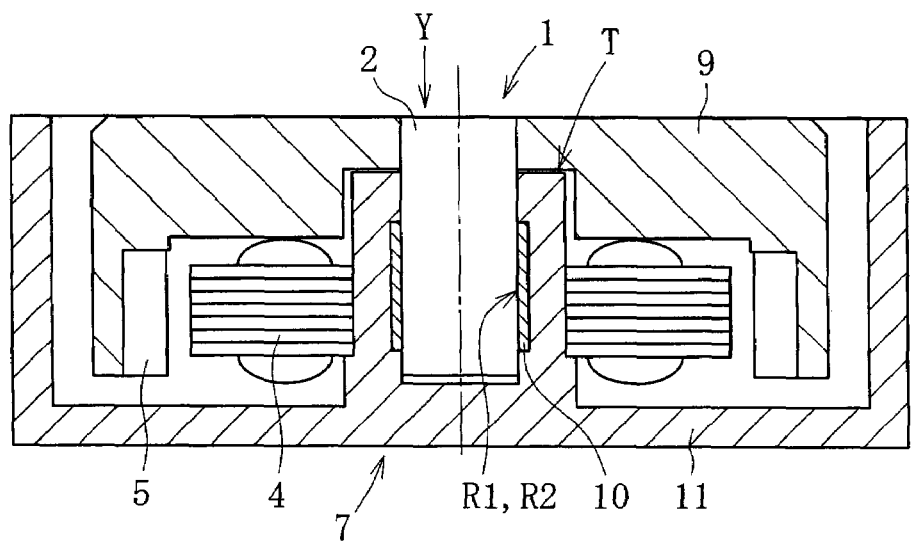
FIG. 1 is a sectional view of an example of a fan motor in which a fluid dynamic bearing device helping to achieve a first object of the present invention has been incorporated.

FIG. 1 is a conceptual drawing showing a fluid dynamic bearing device according to the present invention, more specifically, an example of the construction of a fan motor into which a fluid dynamic bearing device 1 helping to achieve the first object of the present invention has been incorporated. This fan motor is equipped with the fluid dynamic bearing device 1 rotatably supporting a shaft member 2 in a non-contact fashion, vanes rotating together with the shaft member 2, a rotor (flange portion) 9 fixed to the shaft member 2, and a stator coil 4 and a rotor magnet 5 opposed to each other through the intermediation of a radial gap; this fan motor is generally referred to as radial gap type fan motor. The stator coil 4 is mounted to a bearing member 7 of the fluid dynamic bearing device 1, and the rotor magnet 5 is mounted to the rotor 9. When the stator coil 4 is energized, the vanes are rotated by the electromagnetic force between the stator coil 4 and the rotor magnet 5. It is also possible for the fan motor to be a so-called axial gap type fan motor (not shown), in which the stator coil 4 and the rotor magnet 5 are opposed to each other through the intermediation of an axial gap.

During rotation of the vanes, a thrust in the direction of an arrow Y in the drawing acts on the shaft member 2 as the reaction force against the blowing action. Between the stator coil 4 and the rotor magnet 5, there is exerted a magnetic force (repulsive force) directed so as to cancel this thrust, and a thrust load generated due to the difference between the thrust and the magnetic force is supported by a thrust bearing portion T of the fluid dynamic bearing device 1. The radial load acting on the shaft member 2 is supported by radial bearing portions R1 and R2 of the fluid dynamic bearing device 1.

Figure 2:
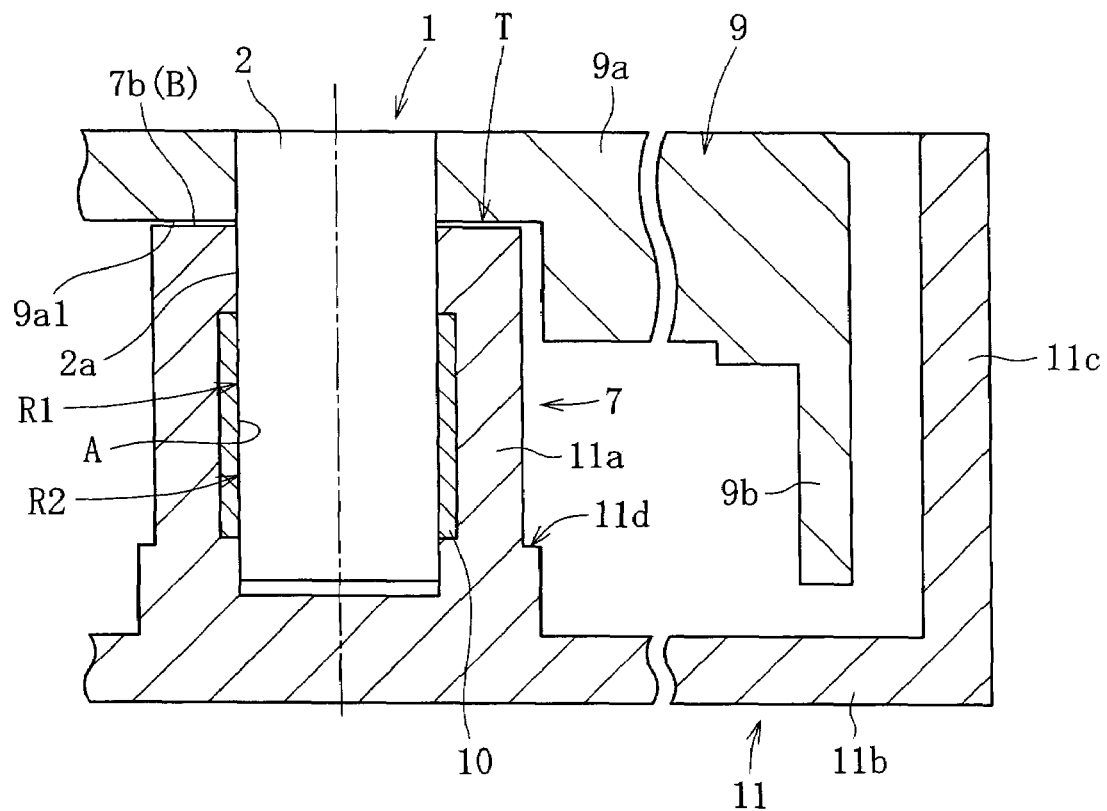
FIG. 2 is a sectional view of a first embodiment of the fluid dynamic bearing device helping to achieve the first object of the present invention.

FIG. 2 is an enlarged sectional view of a main portion of the fluid dynamic bearing device 1 shown in FIG. 1. The fluid dynamic bearing device 1 is mainly composed of the shaft member 2, and the bearing member 7 into the inner periphery of which the shaft member 2 is inserted.

The bearing member 7 is a resin-molded product formed by injection molding with an electroformed portion 10 inserted; it is composed of the electroformed portion 10 and a molded portion 11 formed of a resin material.

It does not matter whether the base resin constituting the resin material used to form the molded portion 11 is amorphous or crystalline as long as the base resin allows injection molding. Examples of the amorphous resin include a polysulfone (PSU), a polyethersulfone (PES), a polyphenyl sulfone (PPSU), and a polyether imide (PEI); examples of the crystalline resin include a liquid crystal polymer (LCP), a polyetheretherketone (PEEK), a polybutyrene terephthalate (PBT), and a polyphenylene sulfide (PPS). One or two or more kinds of fillers selected from various fillers such as a reinforcing material (in form of fibers, powder, etc.), a lubricant, and a conductive material, are mixed with the above-mentioned base resin as needed.

It is also possible for the molded portion 11 to be formed of a metal material. Examples of the metal material that can be used include low-melting metal materials such as a magnesium alloy and an aluminum alloy. In this case, it is possible to achieve an improvement in terms of strength, heat resistance, conductivity, etc. as compared with a case in which a resin material is used. Apart from this, it is also possible for the molded portion 11 to be formed by so-called MIM molding, in which, after injection molding using a mixture of metal powder and binder, degreasing and sintering are effected. Further, it is also possible for the molded portion 11 to be formed by injection molding using a ceramic material.

The molded portion 11 is composed of a sleeve portion 11a in the form of a bottomed cylinder having the electroformed portion 10 in the inner periphery thereof, a substantially disc-shaped base portion 11b extending outwardly from the lower portion of the sleeve portion 11a, and a cylindrical portion 11c extending upwards from the outer peripheral end of the base portion 11b; the portions 11a through 11c are formed as an integral unit having no interfaces. On the outer peripheral surface of the sleeve portion 11a, there is provided a mounting portion 11d for the stator coil 4; the stator coil 4 is mounted to the mounting portion 11d by adhesion or the like. The molded portion 11 is sealed except for the opening at its upper end, and also functions as a casing for accommodating the components of the fan motor. The base portion 11b constitutes the bottom portion of the fan motor, and the cylindrical portion 11c constitutes the side portion of the fan motor.

The electroformed portion 10 has a radial bearing surface A facing the radial bearing gap. As shown in FIG. 3B, in this embodiment, the radial bearing surface A has, as the dynamic pressure generating portions, a plurality of dynamic pressure grooves Aa1 and Aa2 arranged, for example, in a herringbone pattern and formed in two regions vertically spaced apart from each other. The upper dynamic pressure grooves Aa1 are formed asymmetrically in the axial direction with respect to the axial center (axial center between upper and lower inclined groove regions), with an axial dimension X1 of the region on the upper side of an axial center m being larger than an axial dimension X2 of the region on the lower side thereof. On the other hand, the lower dynamic pressure grooves Aa2 are formed symmetrically in the axial direction, with the axial dimensions of the upper and lower regions thereof being the same as the above-mentioned axial dimension X2. In this case, during rotation of the shaft member 2, the force with which the lubricating fluid is drawn in (pumping force) is relatively larger in the upper dynamic pressure grooves Aa1 than in the lower symmetrical dynamic pressure grooves Aa2.

Figure 3A:
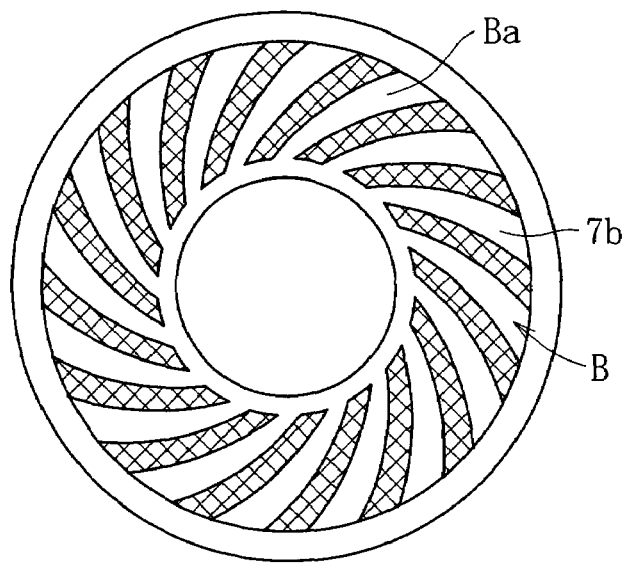
FIG. 3A is a diagram showing an end surface of a bearing member.
Figure 3B:
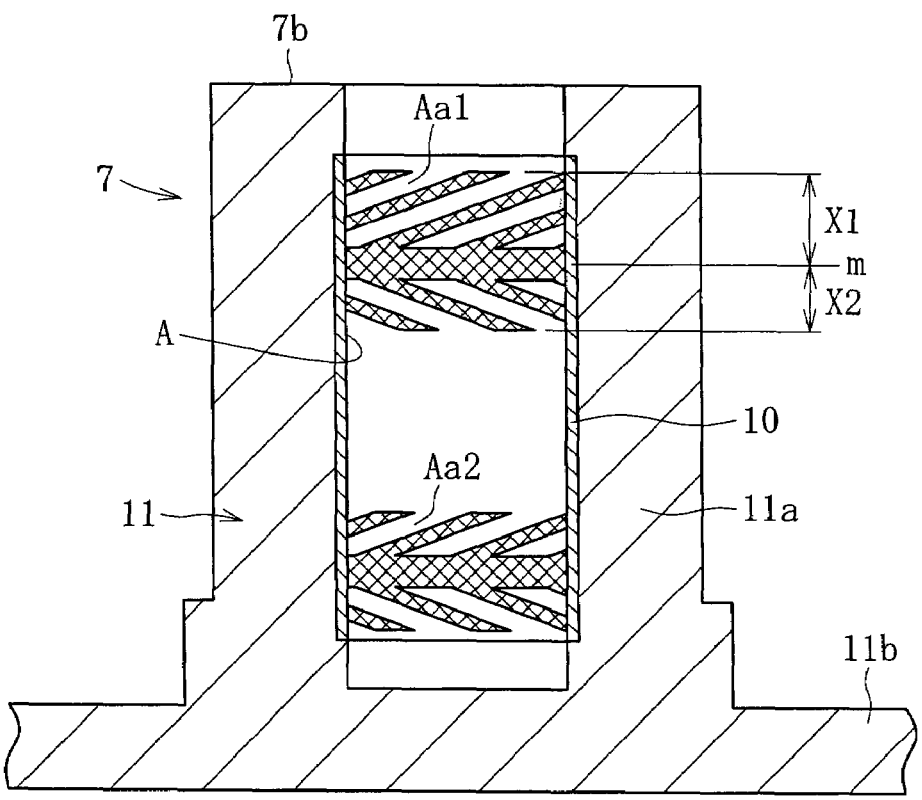
FIG. 3B is a longitudinal sectional view of the bearing member.

Further, a thrust bearing surface B facing the thrust bearing gap is formed in an annular region constituting all or a part of an upper end surface 7b of the bearing member 7 (molded portion 11), and a plurality of dynamic pressure grooves Ba arranged in a spiral pattern as shown in FIG. 3A are formed in the thrust bearing surface B.

The shaft member 2 is formed as a solid shaft formed, for example, of a metal material such as stainless steel. The outer peripheral surface 2a of the shaft member 2 is formed in a circular sectional configuration having no protrusions and recesses. The lower end surface of the shaft member 2 is formed as a flat surface having no surface asperities.

The rotor 9 having, for example, vanes on its outer peripheral surface is fixed to the upper end of the shaft member 2 as the flange portion. The rotor magnet 5 is attached to the inner peripheral surface of the cylindrical portion 9b of the rotor 9. The rotor 9 can be formed integrally with the shaft member 2 by, for example, resin injection molding with the shaft member 2 inserted. There are no particular limitations regarding the configuration, mounting method, etc. of the rotor 9 as long as the rotor 9 can rotate integrally with the shaft member 2; for example, it can also be fixed to the shaft member 2 by adhesion or press-fitting. Further, it is also possible for the rotor 9 to be formed of a metal material.

Of the lower end surface of the disc portion 9a constituting the rotor 9, a partial radial region on the inner side thereof has a thrust receiving surface 9a1 axially opposed to the thrust bearing surface B provided on the upper end surface 7b of the bearing member 7. During rotation of the shaft member 2, the thrust bearing gap of a thrust bearing portion T1 described below is formed between the thrust bearing surface B and the thrust receiving surface 9a1.

The fluid dynamic bearing device 1 is constructed as described above, and the inner space of the bearing member 7 is filled, for example, with a lubricating oil as the lubricating fluid.

In the above-mentioned fluid dynamic bearing device 1, when the shaft member 2 rotates, the radial bearing surface A formed on the electroformed portion 10 constituting the bearing member 7 is opposed to the outer peripheral surface 2a of the shaft member 2 through the intermediation of the radial bearing gap. As the shaft member 2 rotates, dynamic pressure of the lubricating oil generated in the radial bearing gap, and the oil film rigidity is enhanced by the pressure, with the result that the shaft member is supported radially in a non-contact fashion. As a result, there are formed a radial bearing portion R1 and a second radial bearing portion R2 supporting the shaft member 2 radially and rotatably in a non-contact fashion.

Further, when the shaft member 2 rotates, the thrust bearing surface B formed on the upper end surface 7b of the bearing member 7 is opposed to the thrust receiving surface 9a1 of the rotor 9 through the intermediation of the thrust bearing gap. As the shaft member 2 rotates, dynamic pressure of the lubricating oil is also generated in the thrust bearing gap, and the oil film rigidity is enhanced by this pressure, with the result that the shaft member 2 is supported rotatably in the thrust direction in a non-contact fashion. As a result, there is formed the thrust bearing portion T supporting the shaft member 2 rotatably in the thrust direction in a non-contact fashion.

As described above, in the present invention, the thrust bearing portion T is formed by a dynamic pressure bearing, so it is possible to avoid a deterioration in rotational accuracy due to wear, which is a problem involved when the thrust bearing portion T is formed by a pivot bearing. Further, when the thrust bearing portion T is formed by a dynamic pressure bearing, the thrust bearing portion T effects not point support as in the case of a pivot bearing but surface support, so the support area of the thrust bearing portion T is enlarged, and it is possible to form the thrust bearing portion T on the outer side of the radial bearing portions R1 and R2. Thus, it is possible to enhance the bearing rigidity with respect to moment load.

Next, a manufacturing process for the above-mentioned fluid dynamic bearing device 1 will be described with reference to the drawings, centering on the manufacturing process for the bearing member 7.

Figure 4A:
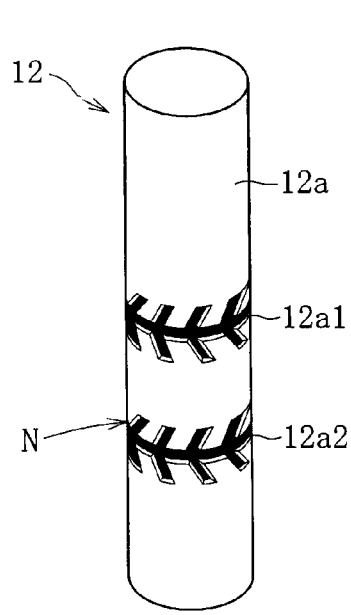
FIG. 4A is a perspective view of a master.
Figure 4B:
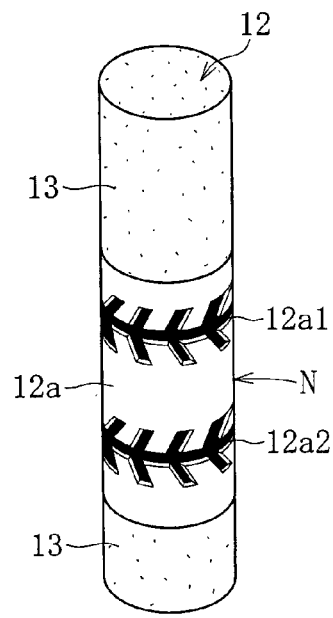
FIG. 4B a perspective view of the master with masking effected thereon.
Figure 4C:
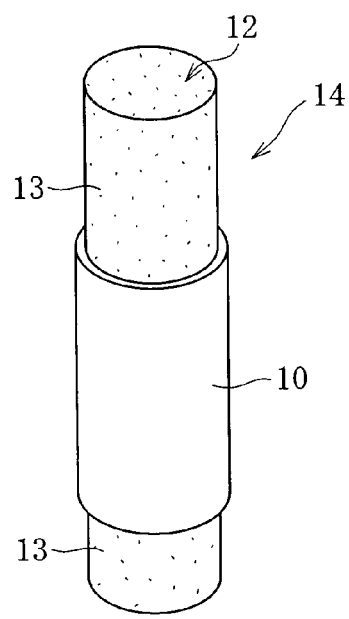
FIG. 4C is a perspective view of an electroforming member.

FIGS. 4A through 4C and FIG. 5 partially show the manufacturing process for the bearing member 7 constituting the above-mentioned fluid dynamic bearing device 1. More specifically, FIG. 4A shows a step for producing a master 12 (master producing step), FIG. 4B shows a step for performing masking on the portions of the master 12 where masking is needed (masking step), and FIG. 4C shows a step for forming an electroforming member 14 by electroforming (electroforming step). After those step, there are performed a step for molding the electroformed portion 10 of the electroforming member 14 with a resin material, and a step for separating the electroformed portion 10 and the master 12 from each other to produce the bearing member 7.

In the master producing step shown in FIG. 4A, the master 12, which is in the form of a solid shaft, is formed of a conductive material such as quenched stainless steel, nickel chromium steel, some other nickel alloy, and a chromium alloy. Apart from those metal materials, the master 12 can be formed of a non-metal material such as a ceramic material, which has been made conductive (by, for example, forming conductive film on surface thereof).

In a part of the outer surface of the master 12, there is formed a shaping portion N for shaping the electroformed portion 10 of the bearing member 7. In the shaping portion N, the protrusion-recess pattern of the inner peripheral surface of the electroformed portion 10 is reversed; at two portions in the axial direction thereof, there are circumferentially formed recesses 12a1 and 12a2 forming the ridge portions between the dynamic pressure grooves Aa1 and Aa2, respectively. Of course, the recesses 12a1 and 12a2 may also be formed in a spiral configuration, etc. according to the configuration of the dynamic pressure generating portions.

In the masking step shown in FIG. 4B, masking 13 (indicated by dot pattern in the drawing) is provided on the outer surface of the master 12 except for the shaping portion N. As the covering material for the masking 13, an existing product having electrical insulating property and corrosion resistance with respect to electrolyte solutions is selected and used as appropriate.

In performing electroforming, the master 12 is immersed in an electrolyte solution containing metal ions such as Ni or Cu ions, and then electricity is supplied to the master 12, to effect deposition (electrodeposition) of the intended metal on the region except for those where the masking 13 is provided (i.e., shaping portion N). The electrolyte solution may contain as needed a sliding material such as carbon, or a stress mitigating material such as saccharin. The kind of electrodeposition metal is selected as appropriate according to the physical properties such as hardness and fatigue strength, and chemical properties required of the bearing surface of the dynamic pressure bearing.

Through the above-mentioned step, there is formed an electroforming member 14 composed of the master 12 and the electroformed portion 10 covering the shaping portion N of the master 12. In this case, the configurations of the recesses 12a1 and 12a2 formed in the shaping portion N are transferred to the inner peripheral surface of the electroformed portion 10, and a plurality of dynamic pressure grooves Aa1 and Aa2 as shown in FIG. 3B are formed so as to be axially spaced apart from each other. When the electroformed portion 10 is too thick, its releasing property with respect to the master 12 deteriorates, and when the electroformed portion 10 is too thin, the durability of the electroformed portion 10 is reduced, so the electroformed portion 10 is set to an optimum thickness according to the requisite bearing performance, the bearing size, the use thereof, etc.

Apart from the above-mentioned method based on electrolytic plating, it is also possible for the electroformed portion 10 to be formed by a method based on non-electrolytic plating. In this case, the conductivity of the master 12 and the insulation property of the masking 13 are not necessary; instead, they are required to exhibit corrosion resistance.

Figure 5:
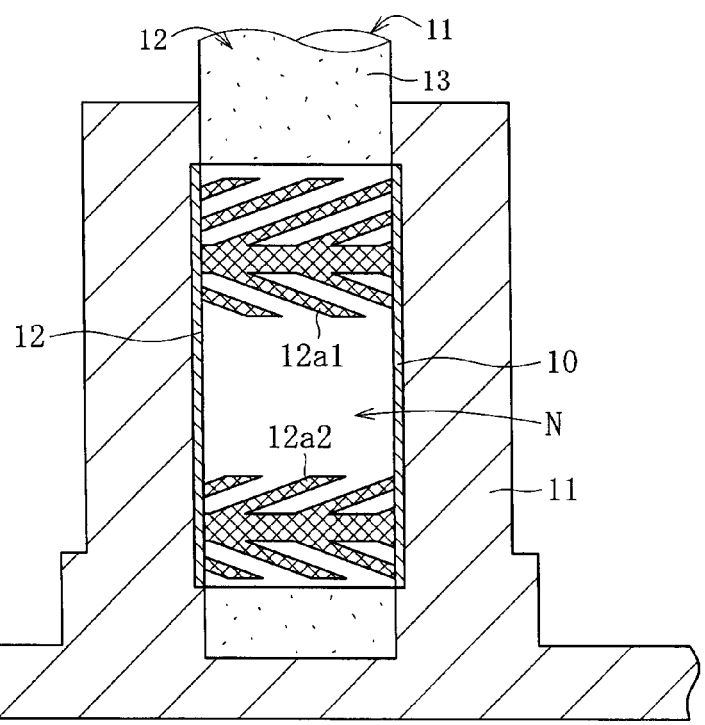
FIG. 5 is a sectional view of the bearing member immediately after insert molding.

The electroforming member 14 formed by the above-mentioned step is transferred to the molding step. Although not shown, in the molding step, the electroforming member 14 is set in a predetermined mold as an insert component, and then injection molding (insert molding) is performed by using the above-mentioned resin material. After the injection of the resin material, the resin material is cured and the mold is opened; then, there is obtained a molded product in which, as shown in FIG. 5, the electroforming member 14, composed of the master 12 and the electroformed portion 10, and the molded portion 11 are integrated. At this time, a plurality of dynamic pressure grooves Ba arranged in a spiral pattern as shown in FIG. 3A are formed in the upper end surface of the molded portion 11 (upper end surface 7b of bearing member 7) simultaneously with the injection molding.

After that, this molded product is transferred to the separating step, where it is separated into the integral unit composed of the electroformed portion 10 and the molded portion 11 (bearing member 7), and the master 12. In this separating step, the inner stress accumulated in the electroformed portion 10 is released, whereby the inner peripheral surface of the electroformed portion 10 is increased in diameter, and is released from the outer peripheral surface 12a of the master 12. The releasing of the inner stress is effected, for example, by imparting an impact to the electroforming member 14 or the bearing member 7, or by imparting an axial pressurizing force to the interface between the inner peripheral surface of the electroformed portion 10 and the outer peripheral surface 12a of the master 12. By releasing the inner stress, the electroformed portion is radially increased in diameter, and a gap of an appropriate size (preferably not smaller than depth of dynamic pressure grooves) is formed between the inner peripheral surface of the electroformed portion 10 and the outer peripheral surface of the master 12, whereby it is possible to pull out the master 12 smoothly in the axial direction from the inner peripheral surface of the electroformed portion 10 while avoiding excessive interference between the dynamic pressure grooves formed in the inner peripheral surface of the electroformed portion 10 and the shaping portion N (recesses 12a1 and 12a2) formed on the outer peripheral surface 12a of the master 12. As a result, it is possible to separate the molded product into the bearing member 7 composed of the electroformed portion 10 and the molded portion 11, and the master 12. It is possible to control the diameter increase amount of the electroformed portion 10, for example, by changing the thickness of the electroformed portion 10.

When it is impossible to sufficiently increase the diameter of the inner periphery of the electroformed portion 10 solely by imparting an impact, it is possible to separate the molded product into the master 12 and the bearing member 7 by heating or cooling the electroformed portion 10 and the master 12 to thereby generate therebetween a difference in thermal expansion amount.

The shaft member 2 produced separately from the master 12 is inserted into the bearing member 7 separated from the master 12 as described above, and the inner space of the bearing member 7 is filled with lubricating oil, whereby the fluid dynamic bearing device 1 as shown in FIG. 2 is completed. Since the master 12 separated can be repeatedly used for electroforming, it is possible to mass-produce high precision bearing members 7 in a stable manner and at low cost. It is also possible for the separated master 12 to be used as it is as the shaft member 2.

As described above, in the present invention, the bearing member 7 can be formed by injection molding with the electroformed portion 10 inserted, so it is possible to simplify the assembly process and achieve a reduction in cost as compared with a case in which, as in the prior art, the sleeve is fixed to the inner periphery of the housing by adhesion, etc.

Further, in the present invention, the bearing member 7 is integrally provided with the mounting portion 11d for the stator coil 4, and also functions as the casing for accommodating the components of the motor, so there is no need to provide a bracket for fixing the bearing device and the stator coil in position. Thus, it is possible to achieve a reduction in the cost of the motor through a reduction in the number of components and a reduction in the number of assembly steps.

Further, due to the characteristics of electroforming, the surface of the electroformed portion, in particular, that on the side where deposition starts, is a dense surface to which the surface precision of the master 12 has been transferred on the order of microns, so, by forming particularly the shaping portion N of the outer surface of the master 12 with high precision, it is possible to form the electroformed portion 10, that is, the radial bearing surface A, with high precision. Thus, according to the construction of the present invention, it is possible to control the rotational accuracy, in particular, that of the radial bearing portion, with high accuracy. Further, since the thrust bearing surface B is formed by molding simultaneously with the insert molding, it is possible to omit the time and effort to separately form the thrust bearing surface B, thereby achieving a further reduction in the cost of the fluid dynamic bearing device 1.

Further, due to the characteristics of electroforming, the outer peripheral surface of the electroformed portion 10 is formed as a rough surface, so, during the insert molding, the resin material forming the molded portion 11 enters the fine asperities of the outer peripheral surface of the electroformed portion 10, thereby exerting an anchoring effect. Thus, a strong fixing force is exerted between the electroformed portion 10 and the molded portion 11, and prevention of rotation and detachment is effected between the electroformed portion 10 and the molded portion 11. Thus, it is possible to provide a high-strength bearing member 7 of high impact resistance.

Figure 6:
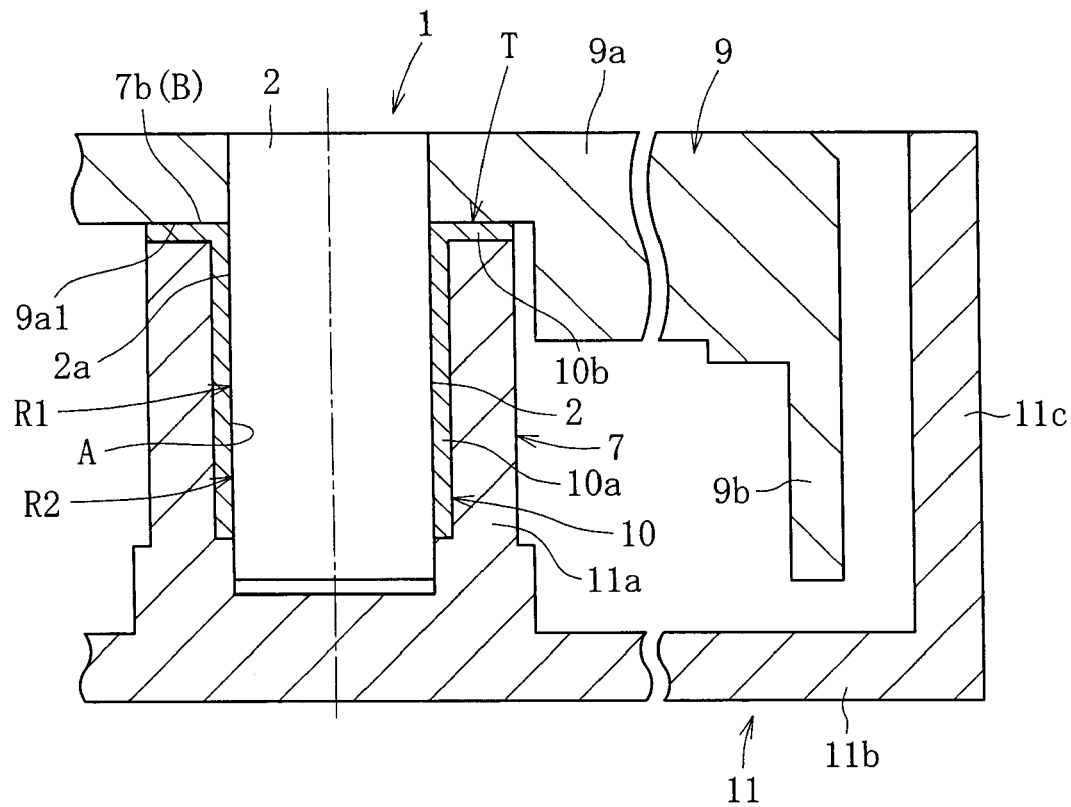
FIG. 6 is a sectional view of a second embodiment of the fluid dynamic bearing device helping to achieve the first object of the present invention.

FIG. 6 shows a fluid dynamic bearing device according to the second embodiment made in order to achieve the first object of the present invention. The fluid dynamic bearing device shown in the drawing differs from the fluid dynamic bearing device described above in that the electroformed portion 10 is composed of a radial electroformed portion 10a and a thrust electroformed portion 10b formed integrally with the radial electroformed portion 10a and having the thrust bearing surface B. Due to the above-mentioned characteristics of electroforming, by thus forming also the thrust bearing surface B on the electroformed portion 10, it is possible to attain high rotational accuracy also in the thrust bearing portion T. Otherwise, the components and function of this fluid dynamic bearing device are the same as those of the fluid dynamic bearing device 1 shown in FIG. 2, so the same components are referred to by the same reference symbols, and a redundant description thereof will be omitted.

Figure 7:
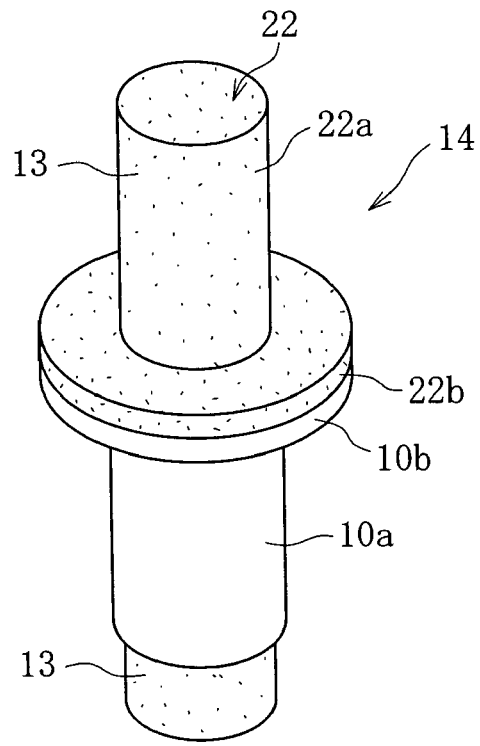
FIG. 7 is a perspective view of another form of the electroforming member.

The bearing member 7 shown in FIG. 6 can be formed by using a master 22 as shown, for example, in FIG. 7. The master 22 is composed of a shaft portion 22a, and a disc portion 22b fixed to the shaft portion 22a. Masking 13 is provided on the outer peripheral surface of the shaft portion 22a except for a partially axial region continuous with the lower end surface of the disc portion 22b and the lower end surface of the disc portion 22b. When electroforming is performed by using the master 22, it is possible to obtain the electroforming member 14, in which the radial electroformed portion 10a and the thrust electroformed portion 10b are formed integrally. By performing insert molding by using this electroforming member, the bearing member 7 as shown in FIG. 6 is formed.

While in FIG. 6 the radial electroformed portion 10a and the thrust electroformed portion 10b are integrated with each other, it is also possible to form them as separate portions. When forming them as separate portions, the formation region, for example, of the masking 13 is changed.

Figure 8:
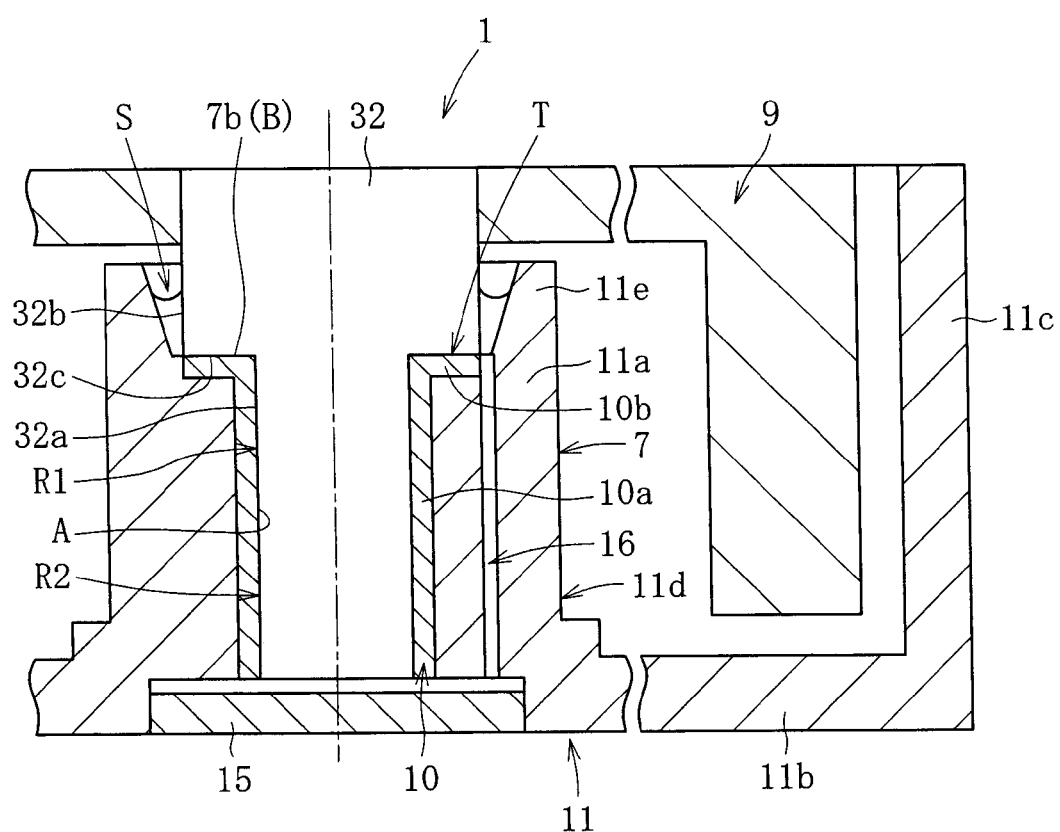
FIG. 8 is a sectional view of a third embodiment of the fluid dynamic bearing device helping to achieve the first object of the present invention.

FIG. 8 shows a fluid dynamic bearing device according to the third embodiment made in order to achieve the above-mentioned first object of the present invention. The fluid dynamic bearing device shown in the drawing mainly differs from that of the embodiment shown in FIG. 6 in that the outer peripheral surface of a shaft member 32 is divided into a small diameter outer peripheral surface 32a and a large diameter outer peripheral surface 32b, and that the thrust bearing gap is provided between a step surface 32c connecting the two outer peripheral surfaces and the upper end surface 7b (thrust bearing surface B) of the bearing member 7 opposed thereto. With this construction, the small diameter outer peripheral surface 32a of the shaft member 32 and the step surface 32c of the shaft member 32 face the radial bearing gap and the thrust bearing gap, respectively. Thus, as compared with the above-mentioned construction, in which the thrust bearing gap is provided between the flange portion (rotor 9), separate from the shaft member, and the bearing member, it is possible to control the perpendicularity between the radial bearing gap and the thrust bearing gap easily and with high accuracy, thus making it possible to achieve a further enhancement in rotational accuracy.

Further, in this embodiment, the molded portion 11 constituting the bearing member 7 is integrally provided with a seal portion 11e protruding axially upwards from the outer side of the upper end of the sleeve portion 11a, and a seal space S of a predetermined volume is formed between the inner peripheral surface of the seal portion 11e and the large diameter outer peripheral surface 32b of the shaft member 32. The seal space S has a volume large enough to absorb the thermal expansion amount of the lubricating oil due to temperature changes, so the oil level is constantly within the seal space S. In this embodiment, the inner peripheral surface of the seal portion 11e is formed as a tapered surface gradually increased in diameter axially upwards. That is, the seal space S is in a tapered configuration gradually diminished toward the interior of the bearing member 7, and with the seal space filled with lubricating oil, a drawing-in force toward the interior of the bearing due to capillary attraction is exerted on the lubricating oil. As a result, leakage of the lubricating oil is reliably prevented, thus providing a construction suitable for use in a motor in which contamination with lubricating oil is to be avoided.

In the inner space of a fluid dynamic bearing device of this type, local negative pressure may be generated during operation of the bearing. Generation of such a negative pressure leads to generation of bubbles as well as leakage of lubricating oil and generation of vibration attributable thereto. In view of this, in this embodiment, the lower end of the bearing member 7 (sleeve portion 11a) is open, and the opening is sealed by a cover member 15, providing a bottom gap between the sleeve portion 11a and the cover member 15; further, there provided a circulation path (through-hole) 16 establishing communication between the bottom gap and the seal space S open to the atmosphere. With this construction, there is formed a continuous circulation path composed of the thrust bearing gap, the radial bearing gap, the bottom gap, and the circulation path 16. During operation of the bearing, the lubricating oil filling the interior of the bearing flows to circulate through the circulation path, whereby the requisite pressure balance of the lubricating oil is maintained, and the above-mentioned problem can be prevented. The circulation path 16 is formed, for example, by machining or the like after the molding of the bearing member 7; apart from this, when molding the bearing member 7 (molded portion 11), it is also possible to provide the molding die for molding the same with a pin to thereby form the circulation path simultaneously with the molding of the molded portion 11. Otherwise, the components of this fluid dynamic bearing device is substantially the same as those of the above-mentioned fluid dynamic bearing device, so the same components are indicated by the same reference symbols, and a redundant description thereof will be omitted.

While in the above-mentioned embodiment fluid dynamic pressure is generated by the dynamic pressure grooves of a herringbone configuration or a spiral configuration in the radial bearing portions R1 and R2, this should not be construed restrictively. For example, it is also possible to adopt a multi-arc bearing, a step bearing, or a non-cylindrical bearing for the radial bearing portions R1 and R2. In those bearings, a plurality of arcuate surfaces, axial grooves, and harmonic waveform generating surfaces constitute the dynamic pressure generating portion, respectively. As in the above-mentioned embodiment, such a dynamic pressure generating portion can be formed in the electroformed portion 10 of the bearing member 7; regarding the method of forming the dynamic pressure generating portion, it is based on the steps for forming the dynamic pressure grooves, so a detailed description thereof will be omitted.

Figure 9:
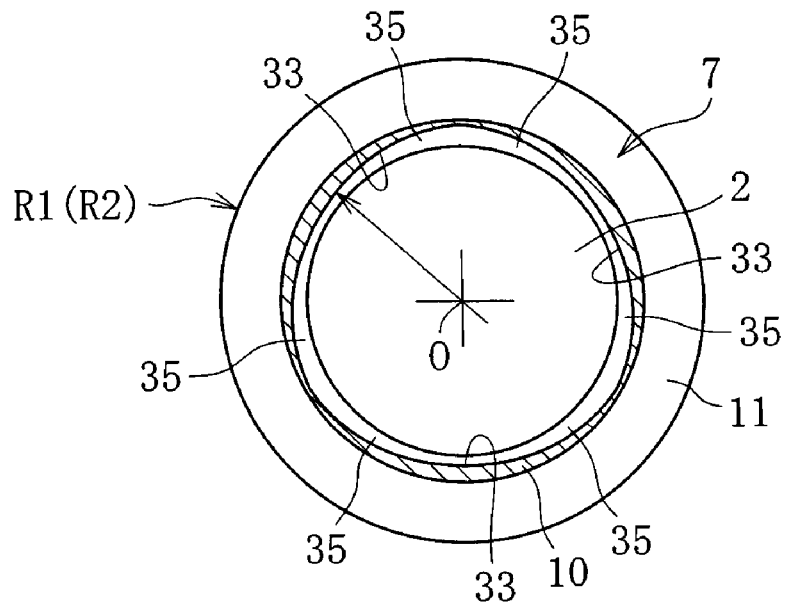
FIG. 9 is a sectional view of a radial bearing portion formed by a multi-arc bearing.

FIG. 9 shows an example of the construction in which one or both of the radial bearing portions R1 and R2 are formed by multi-arc bearings. In this example, the region of the inner peripheral surface of the bearing member 7 (electroformed portion 10) constituting the radial bearing surface A is composed of three arcuate surfaces 33 (so-called three-arc bearing). The respective centers of curvature of the three arcuate surfaces 33 are offset from the axial center O of the bearing member 7 by the same distance. In each of the regions defined by the three arcuate surfaces 33, the radial bearing gap is a wedge-shaped gap 35 gradually diminished in a wedge-like fashion in both circumferential directions. Thus, when the bearing member 7 and the shaft member 2 (inclusive of shaft member 32 shown in FIG. 8) make a relative rotation, the lubricating oil in the radial bearing gap is forced into the minimum gaps of the wedge-shaped gaps 35 and its pressure increases. By this dynamic pressure action of the lubricating oil, the bearing member 7 and the shaft member 2 are supported in a non-contact fashion. It is also possible to form axial grooves one step deeper and called separation grooves in the boundary portions between the three arcuate surfaces 33.

Figure 10:
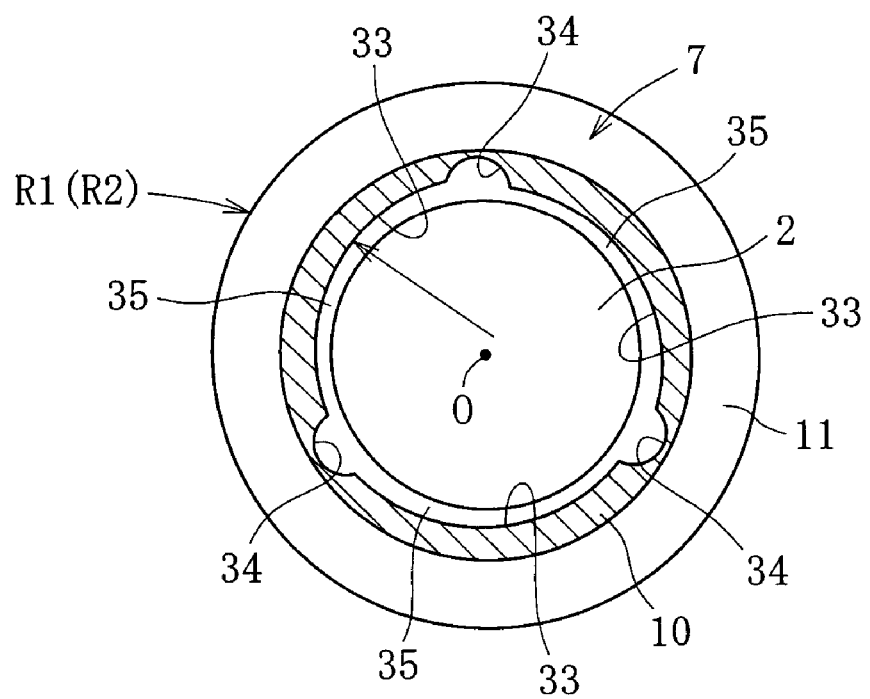
FIG. 10 is another sectional view of a radial bearing portion formed by a multi-arc bearing.

FIG. 10 shows another example of the construction in which one or both of the radial bearing portions R1 and R2 are formed by multi-arc bearings. Also in this example, the region of the inner peripheral surface of the bearing member 7 is composed of three arcuate surfaces 33 (so-called three-arc bearing); in each of the regions defined by the three arcuate surfaces 33, the radial bearing gap is a wedge-shaped gap 35 gradually diminished in one circumferential direction in a wedge-like fashion. A multi-arc bearing of this construction is also referred to as tapered bearing. In the boundary portions between the three arcuate surfaces 33, there are formed axial grooves one step deeper and called separation grooves 34. Thus, when the bearing member 7 and the shaft member 2 make a relative rotation in a predetermined direction, the lubricating oil in the radial bearing gap is forced into the minimum gaps of the wedge-shaped gaps 35, and its pressure increases. By this dynamic pressure action of the lubricating oil, the bearing member 7 and the shaft member 2 are supported in a non-contact fashion.

Figure 11:
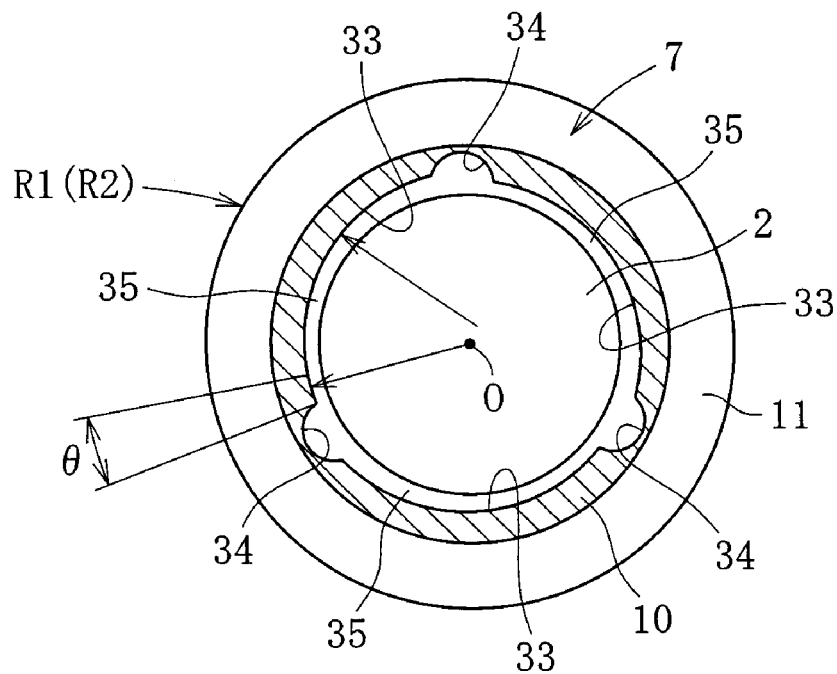
FIG. 11 is another sectional view of a radial bearing portion formed by a multi-arc bearing.

FIG. 11 shows another example of the construction in which one or both of the radial bearing portions R1 and R2 are formed by a multi-arc bearing. In this example, the construction shown in FIG. 10 is modified such that predetermined regions θ on the minimum gap side of the three arcuate surfaces 33 are formed as concentric arcuate surfaces whose centers of curvature is the axial center O of the bearing member 7 (shaft member 2). Thus, each of the predetermined regions θ exhibits a fixed radial bearing gap (minimum gap). A multi-arc bearing of this construction is also called a tapered flat bearing.

Figure 12:
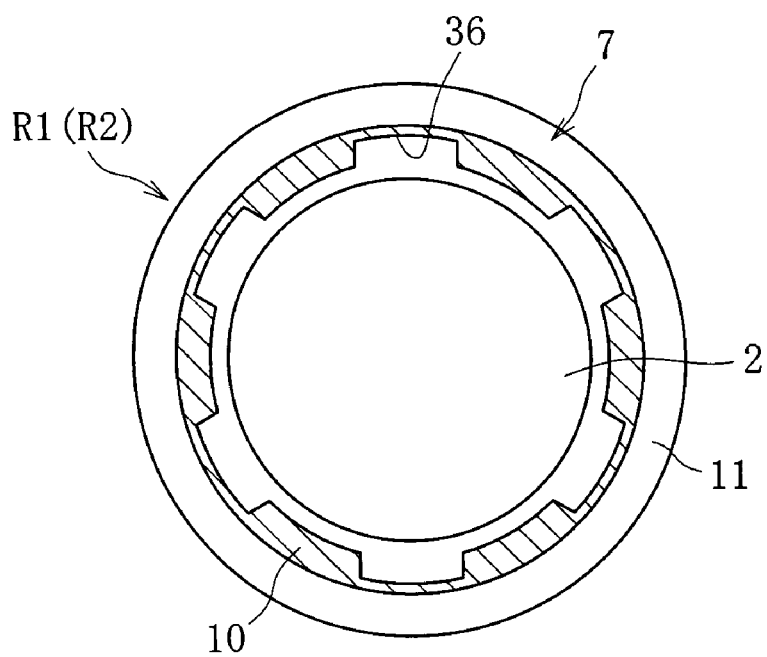
FIG. 12 is a sectional view of a radial bearing portion formed by a step bearing.

FIG. 12 shows an example of the construction in which one or both of the radial bearing portions R1 and R2 are formed by step bearings. In this example, a plurality of dynamic pressure grooves 36 in the form of axial grooves are provided at predetermined circumferential intervals in the region of the inner peripheral surface of the bearing member 7 (electroformed portion 10) constituting the radial bearing surface A.

Figure 13:
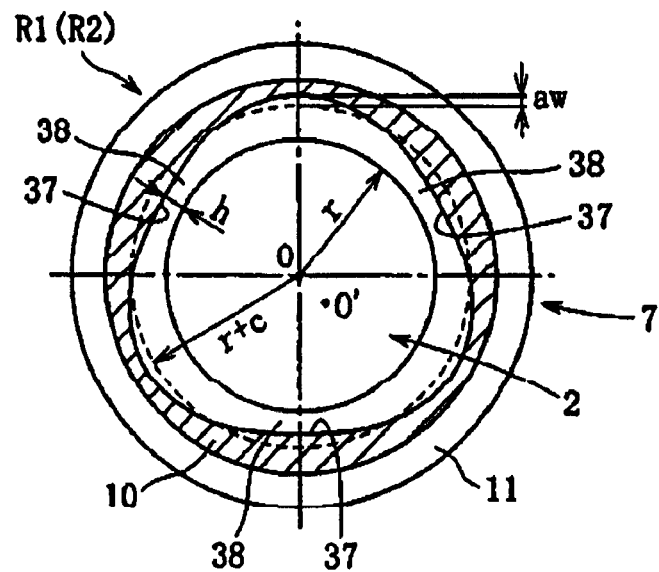
FIG. 13 is a sectional view of a radial bearing portion formed by a non-cylindrical bearing.

FIG. 13 shows an example of the construction in which one or both of the radial bearing portions R1 and R2 are formed by non-cylindrical bearings. In this example, the region of the bearing member 7 (electroformed portion 10) constituting the radial bearing surface A is formed by three harmonic waveform surfaces 37. In each of the regions defined by the three harmonic waveform surfaces 37, the radial bearing gap is a wedge-shaped gap 38 gradually diminished in a wedge-like fashion in both circumferential directions. Thus, when the shaft member 2 and the bearing member 7 make a relative rotation, the lubricating oil filled in the radial bearing gap is forced into the minimum gap sides of the wedge-shaped gaps 38 according to the direction of the relative rotation, and its pressure increases. By this dynamic pressure action of the lubricating oil, the shaft member 2 and the bearing member 7 are supported in a non-contact fashion. When there is no eccentricity (i.e., when shaft center is axial center O), the minimum width h of the wedge-shaped gaps 38 can be approximated by the following equation:

$$h = c + aw \cdot \cos(Nw \cdot \theta)$$

where c, aw, and Nw are constants, of which c is the average bearing radial gap, aw is the wave amplitude, θ is the phase in the circumferential direction, and Nw is the wave number (Nw≧2; in this embodiment, Nw=3). While in the example shown the shaft member 2 and the bearing member 7 are concentric, sharing the axial center O, it is also possible to shift the center of the shaft member 2 to an axial center O'.

While in the above-mentioned constructions two radial bearing portions are axially spaced apart from each other as in a case of the radial bearing portions R1 and R2, it is also possible to provide a single radial bearing portion extending over the vertical region of the inner peripheral surface of the bearing member 7, or three or more radial bearing portions. Further, while the multi-arc bearings shown in FIGS. 9 through 11 are so-called three-arc bearings, this should not be construed restrictively; it is also possible to adopt a so-called four-arc bearing, a five-arc bearing, or a multi-arc bearing formed by six or more arcuate surfaces. Further, while the non-cylindrical bearing shown in FIG. 13 is formed by three harmonic waveform surfaces, it is also possible, as in a case of the multi-arc bearings, to adopt a non-cylindrical bearing formed by four or more harmonic waveform surfaces.

Further, while in the above-mentioned embodiment the dynamic pressure generating portion is formed in the radial bearing surface A of the electroformed portion 10 constituting the bearing member 7, it is also possible to provide the dynamic pressure generating portion in the outer peripheral surface 2a of the shaft member 2 opposed to the radial bearing surface A. In this case, the radial bearing surface A of the electroformed portion 10 is formed as a cylindrical surface having no surface asperities.

Further, while in the above-mentioned cases the dynamic pressure generating portion is provided in the radial bearing surface A of the electroformed portion 10 or in the outer peripheral surface 2a of the shaft member, and dynamic pressure is generated in the radial bearing gap by the dynamic pressure portion, thus forming the radial bearing portions R1 and R2 by dynamic pressure bearings, it is also possible to form the radial bearing portions R1 and R2 by cylindrical bearings (not shown) by forming the radial bearing surface A of the electroformed portion 10 as a cylindrical surface with no surface asperities and forming the outer peripheral surface 2a of the shaft member 2 as a surface of a circular sectional configuration with no surface asperities.

Further, while in the above-mentioned construction example the thrust bearing portion T generates a dynamic pressure action of lubricating oil by dynamic pressure grooves of a spiral configuration, it is also possible for the thrust bearing portion T to be formed by a so-called step bearing, a so-called corrugated bearing (with corrugated step form) or the like (not shown), in which a plurality of dynamic pressure grooves in the form of radial grooves are provided at predetermined circumferential intervals in the region constituting the thrust bearing surface B. Further, as in the case of the radial bearing portions R1 and R2, in the thrust bearing portion T, the dynamic bearing portion may be formed in the thrust receiving surface 9a1 of the rotor 9 or the step surface 32c of the shaft member 32 opposed to the thrust bearing surface B.

Figure 14:
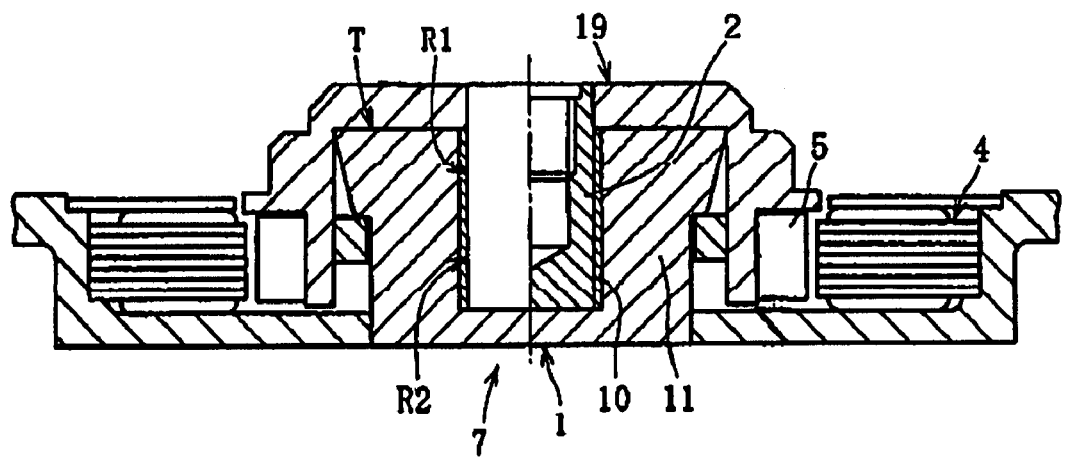
FIG. 14 is a sectional view of an example of a spindle motor for an information apparatus with a fluid dynamic bearing device incorporated therein.

The fluid dynamic bearing device 1 described above may be incorporated into a motor other than a fan motor. FIG. 14 shows an example of such application, conceptually showing an information apparatus spindle motor for use in a disk drive device such as an HDD. In this information apparatus spindle motor, the flange portion mounted to the shaft member 2 of the fluid dynamic bearing device 1 is formed by a disk hub 19 retaining one or a plurality of disks. With this construction of the motor, the molded portion 11 is formed solely by the sleeve portion 11a having the mounting portion 11d for the stator coil 5, and the base portion 11b and the cylindrical portion 11c, mentioned above, are separate from each other. Depending upon the way and the like the stator coil 4 and the rotor magnet 5 are mounted, it is also possible to form the portions integrally as described above. Otherwise, the components and effects of this example is the same as those of the one described above, so the same components are indicated by the same reference symbols, and a redundant description thereof will be omitted.

Figure 15:
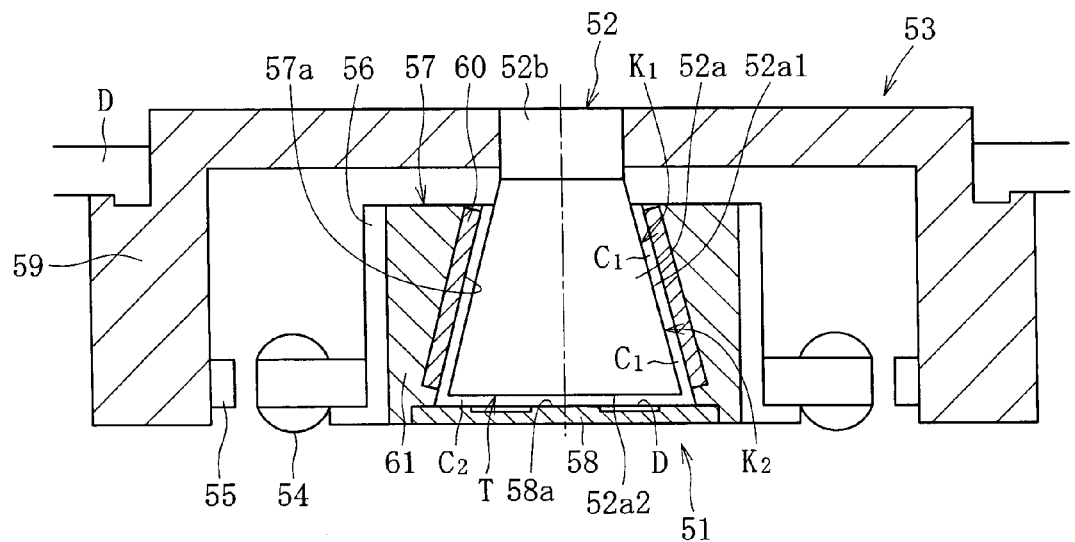
FIG. 15 is a sectional view of an example of a spindle motor for an information apparatus into which a fluid dynamic bearing device helping to achieve the second object of the present invention has been incorporated.

FIG. 15 is a conceptual drawing showing an example of the construction of an information apparatus spindle motor into which a fluid dynamic bearing device 51 according to the present invention, more specifically, a fluid dynamic bearing device helping to achieve the second object mentioned above, is incorporated. This information apparatus spindle motor is for use in a disk drive device such as an HDD, and is equipped with the fluid dynamic bearing device 51 rotatably supporting a shaft member 52, a disk hub 59 mounted to the disk member 52 and retaining one or a plurality of disks D, a stator coil 54 and a rotor magnet 55 opposed to each other through the intermediation of a radial gap, and a bracket 56. The stator coil 54 is mounted to the outer periphery of the bracket 56, and the rotor magnet 55 is mounted to the inner periphery of the disk hub 59. When the stator coil 54 is energized, the rotor magnet 55 is rotated by an electromagnetic force generated between the stator coil 54 and the rotor magnet 55, and with that, the shaft member 52 and the disk hub 59 rotate as an integral unit (rotary member 53).

When the fluid dynamic bearing device 51 shown in FIG. 15 is used in some other information apparatus spindle motor such as a spindle motor for an optical disk apparatus or a magneto-optical disk apparatus, a turntable supporting disks is fixed to the shaft member 52; when the fluid dynamic bearing device 51 is used in the polygon scanner motor of a laser beam printer (LBP), a polygon mirror is fixed to the shaft member 52; and when the fluid dynamic bearing device 51 is used in the fan motor of a personal computer (PC), a fan is fixed to the shaft member 52 (none of those examples are shown).

The fluid dynamic bearing device 51 is mainly composed of the shaft member 52, a bearing member 57 arranged in the outer periphery of the shaft member 52, and a cover member 58 closing an opening at one end of the bearing member 57. In the following, for the sake of convenience in illustration, the cover member 58 side will be referred to as lower side, and the side axially opposite thereto will be referred to as upper side.

The shaft member 52 is formed of a metal material providing the requisite rigidity and wear resistance such as stainless steel. The shaft member 52 is composed of a truncated-cone-shaped conical portion 52a formed in small diameter on one axial side (upper side in example shown) and in large diameter on the other axial side (lower side in example shown), and a cylindrical base portion 52b provided on top of the conical portion 52a and integrated with the conical portion 52a. An outer peripheral surface 52a1 and a lower end surface 52a2 of the conical portion 52a are formed as smooth surfaces having no surface asperities.

The disk hub 59 is fixed to the base portion 52b of the shaft member 52 by an appropriate means such as press-fitting or press-fitting/adhesion, with the shaft member 52 and the disk hub 59 being integrated to form the rotary member 53. It is also possible to form the rotary member 53 by injection-molding the disk hub 59 with the shaft member 52 inserted.

The bearing member 57 is composed of an electroformed portion 60 whose inner peripheral surface is formed as a conical surface, and a molded portion 61 covering the outer periphery of the electroformed portion 60. As described below, the molded portion 61 is formed by injection molding with the electroformed portion 60 inserted.

An inner peripheral surface 57a of the bearing member 57 is formed as a tapered surface corresponding to the configuration of the outer peripheral surface of the conical portion 52a of the shaft member 52. The respective generatrices of the inner peripheral surface 57a of the bearing member 57 and the outer peripheral surface 52a1 of the conical portion 52a of the shaft member 52 are parallel to each other, so the two surfaces 57a and 52a1 can be brought into surface contact with each other. As described below, as the shaft member 52 rotates, there are formed, between the inner peripheral surface 57a of the bearing member 57 and the outer peripheral surface 52a1 of the conical portion 52a of the shaft member 52, two inclined bearing gaps C1 vertically spaced apart from each other and inclined so as to be of small diameter on the axially upper side and of large diameter on the axially lower side. While in the example shown the gap width of the inclined bearing gaps C1 is exaggerated so as to facilitate the understanding of the construction, the dimension of the gap is actually approximately several μm to ten and several μm.

Figure 16:
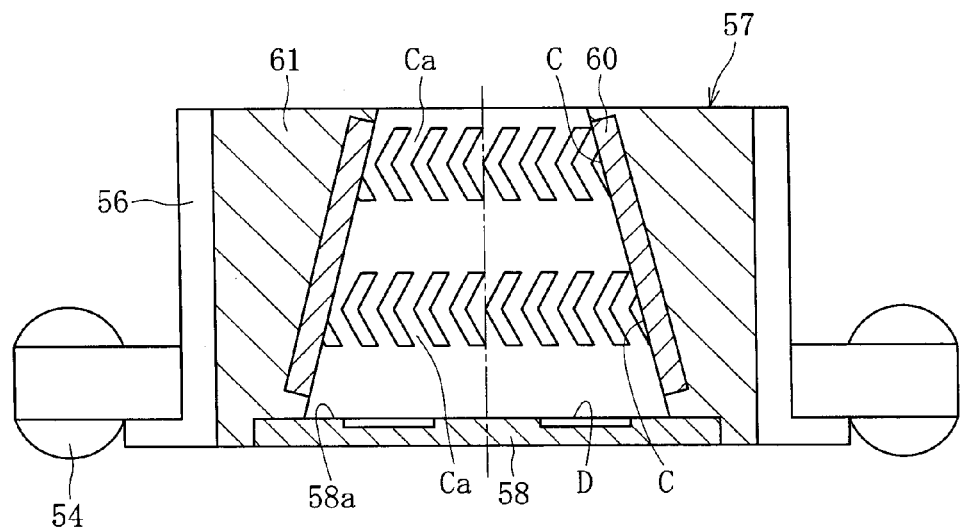
FIG. 16 is an enlarged sectional view of a main portion of the fluid dynamic bearing device of FIG. 15.

As shown in FIG. 16, on the inner peripheral surface of the electroformed portion 60, there are formed two inclined bearing surfaces C vertical spaced apart from each other; during rotation of the shaft member 52, there are formed the inclined bearing gaps C1 in regions respectively opposed to the inclined bearing surfaces C. In each of the inclined bearing surfaces C, there are formed, as the dynamic pressure generating portions, a plurality of dynamic pressure grooves Ca arranged, for example, in a herringbone configuration. While in the example shown the two inclined bearing surfaces C are formed on the inner peripheral surface of the same electroformed portion 60, it is also possible to form the inclined bearing surfaces C individually on two or more electroformed portions 60. As the dynamic pressure groove configuration, it is also possible to adopt, apart from the herringbone configuration shown in the drawing, a spiral configuration, etc.

Figure 17:
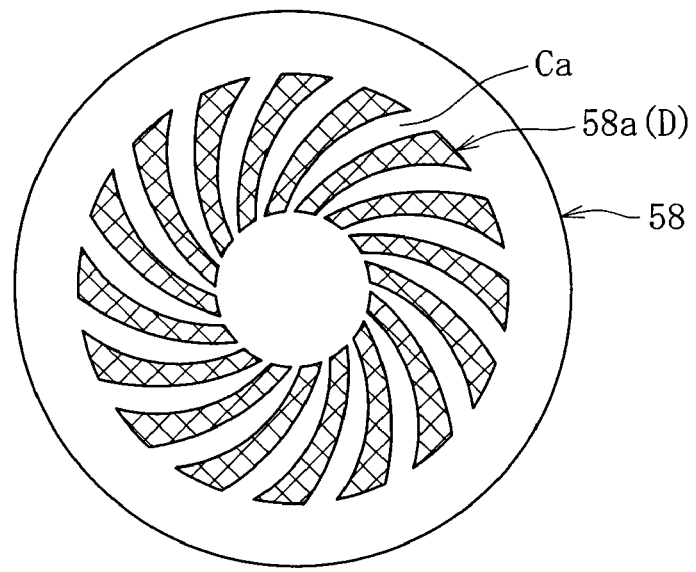
FIG. 17 is a sectional view of the upper end surface of a cover member.

The cover member 58 is formed in a disc-like configuration of a metal material such as stainless steel or brass, and is fixed, by adhesion or the like, to a step portion formed in an opening on the large diameter side of the bearing member 57. A thrust bearing surface D is formed on an upper end surface 58a of the cover member 58; during rotation of the shaft member 52, a thrust bearing gap C2 is formed in the region opposed to the thrust bearing surface D. In the thrust bearing surface, there are formed, as the thrust dynamic pressure generating portions for generating dynamic pressure in the thrust bearing gap C2, a plurality of dynamic pressure grooves Da arranged in a spiral configuration as shown, for example, in FIG. 17. Apart from the spiral configuration shown in the drawing, it is also possible to adopt, as the dynamic pressure groove arrangement configuration, a herringbone configuration, a radial configuration, etc. Further, it is also possible for the thrust bearing surface D having dynamic pressure generating portions such as dynamic pressure grooves to be formed in the lower end surface 52a2 of the shaft member 52.

Although not shown, it is possible to form a seal space between the upper end of the inner peripheral surface of the bearing member 57 and the outer peripheral surface 52a1 of the shaft member 52 opposed thereto. This seal space is formed as a tapered space which is narrower, for example, on the bearing device interior side. With this tapered configuration, lubricating oil is drawn in toward the interior side of the bearing device by capillary attraction, so it is possible to prevent leakage of the lubricating fluid to the exterior of the bearing device. The seal space has a volume large enough to absorb the thermal expansion amount of the lubricating fluid due to temperature changes, so the lubricating fluid constantly remains in the seal space. It is also possible to fix a seal member separate from the bearing member to the inner peripheral surface of the upper end portion of the bearing member 57, and to form a seal space between the inner peripheral surface of the seal member and the outer peripheral surface of the shaft member opposed thereto.

Figure 18:
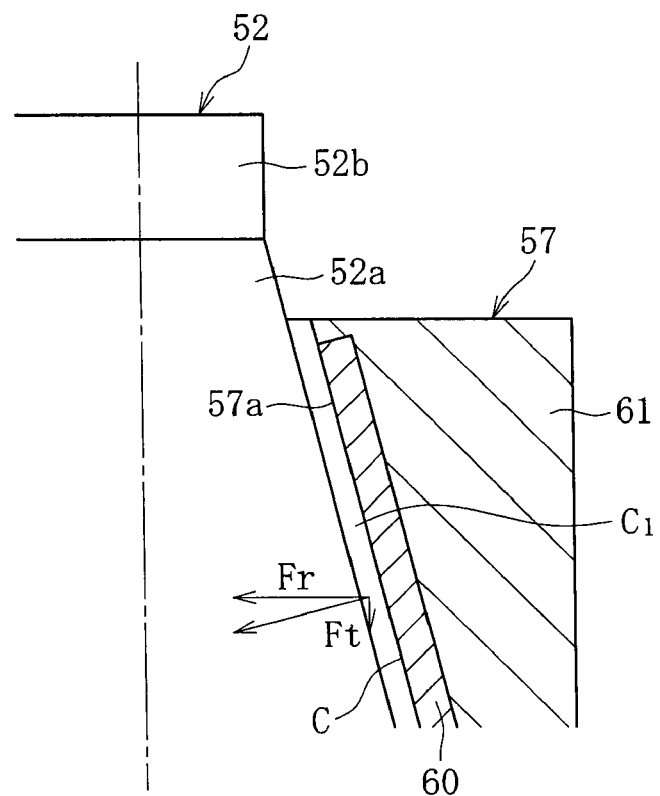
FIG. 18 is a schematic diagram illustrating a dynamic pressure action in an inclined bearing gap.

In the above-mentioned construction, the inner space of the bearing device is filled, for example, with lubricating oil as the lubricating fluid. When, in this state, the shaft member 52 and the bearing member 57 are caused to make a relative rotation (in this embodiment, shaft member 52 rotates), inclined bearing surfaces C on the inner peripheral surface of the bearing member 57 are opposed to the outer peripheral surface 52a1 of the shaft member 52 through the intermediation of the two inclined bearing gaps C1. As the shaft member 52 rotates, dynamic pressure of the lubricating oil is generated in each inclined bearing gap C1, and as shown in FIG. 18, there are exerted on the shaft member 52 a horizontal (radial) component force Fr and a vertically downward component force Ft (in thrust direction). As a result, there are formed a first inclined bearing portion K1 and a second inclined bearing portion K2 rotatably supporting the shaft member 52 radially and in one thrust direction in a non-contact fashion.

As the shaft member 52 rotates, the thrust bearing surface D formed on the upper end surface 58a of the cover member 58 is opposed to the lower end surface 52a2 of the shaft member 52 through the intermediation of the thrust bearing gap C2. As the shaft member 52 rotates, dynamic pressure of the lubricating oil is generated in the thrust bearing gap C2, and the rigidity of the oil film of the lubricating oil formed in the thrust bearing gap C2 is enhanced by the pressure, and the shaft member 2 is rotatably supported upwards in the thrust direction in a non-contact fashion. As a result, there is formed a thrust bearing portion T rotatably supporting the shaft member 52 in the other thrust direction in a non-contact fashion.

Next, a process for manufacturing the bearing member 57 will be described.

Figure 19A:
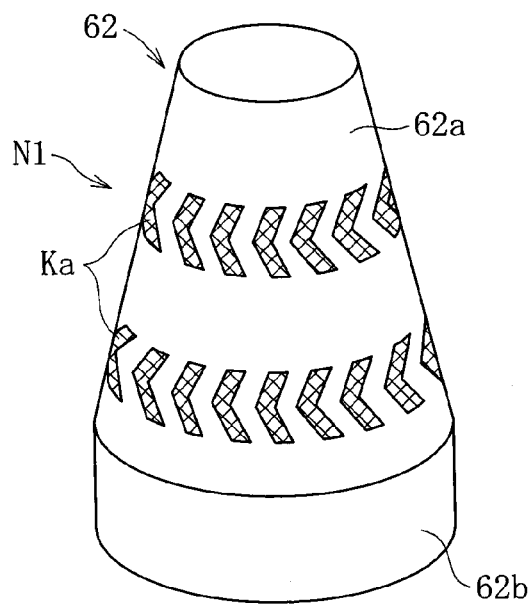
FIG. 19A is a perspective view of a master.
Figure 19B:
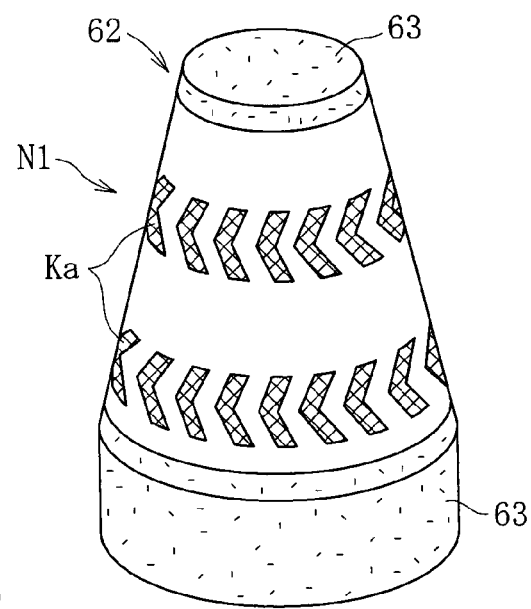
FIG. 19B is a perspective view of the master with masking effected thereon.
Figure 20:
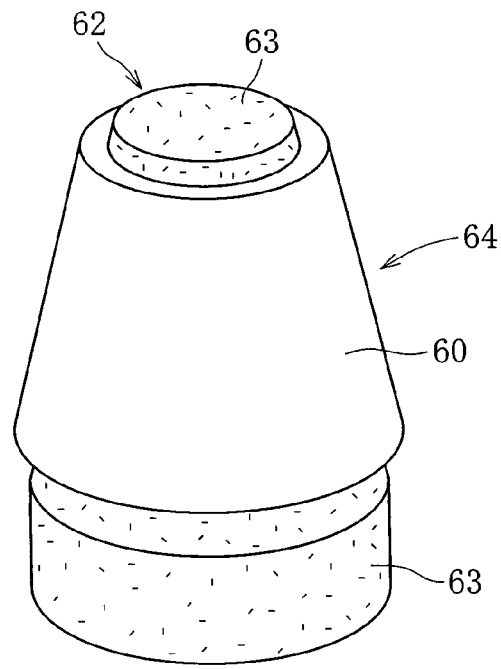
FIG. 20 is a perspective view of an electroforming member.
Figure 21:
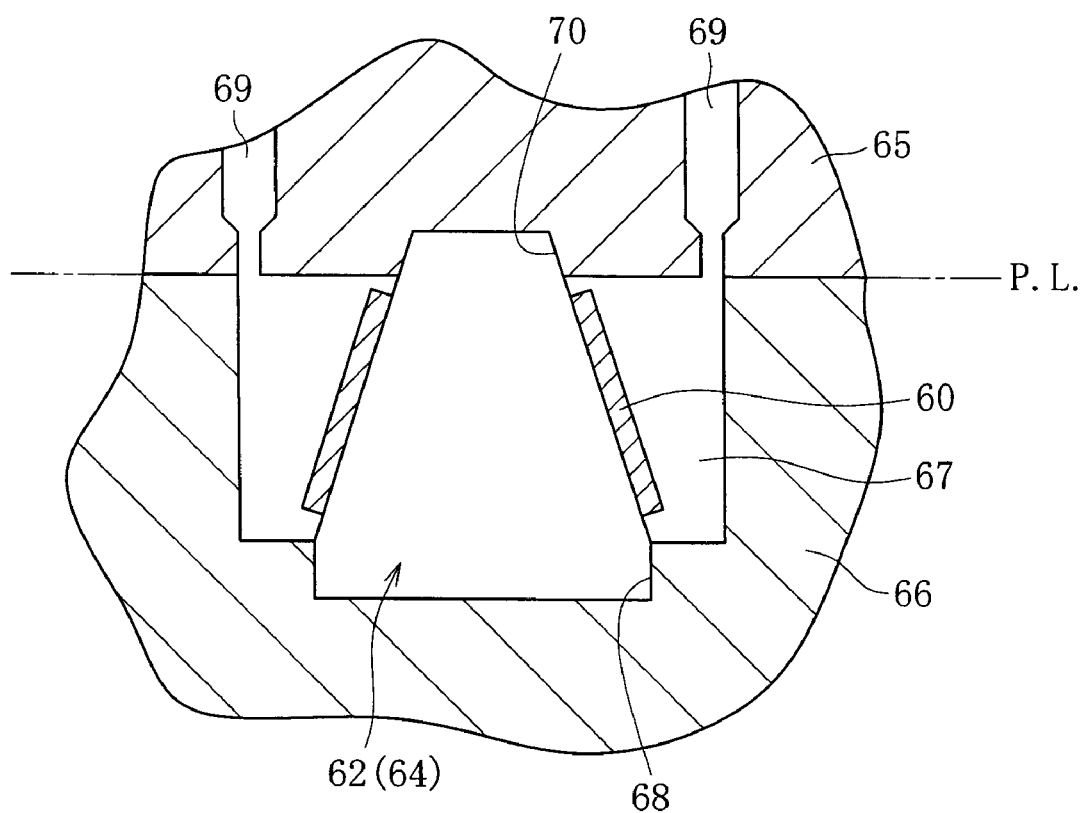
FIG. 21 is a schematic view of a mold for injection molding with the electroforming member mounted therein.

FIGS. 19A through 21 show the steps for manufacturing the bearing member 57 of the above-mentioned bearing device. More specifically, FIG. 19A shows a step for producing a master 62 (master producing step), FIG. 19B shows a step for effecting masking on portions of the master 62 where masking is required (masking step), FIG. 20 shows a step for forming an electroforming member 64 by electroforming (electroforming step), and FIG. 21 shows a step for molding an electroformed portion 60 of the electroforming member 64 with resin or the like (molding step). After those steps, the bearing member 57 is produced through the step for separating the electroformed portion 60 and the master 62 from each other.

In the master producing step shown in FIG. 19A, the master 62 is formed of a conductive material such as stainless steel that has been subjected to quenching, nickel-chromium steel, some other nickel alloy, or a chromium alloy. Apart from those metal materials, the master 62 may also be formed of a non-metal material such as a ceramic material that has undergone conductivity imparting treatment (e.g., formation of conductive film on surface thereof). The master 62 is equipped with a truncated-cone portion 62a, and a cylindrical portion 62b formed integrally with the truncated-cone portion 62a and extending axially from the lower end of the truncated-cone portion 62a. The outer peripheral surface of the truncated-cone portion 62a is formed as a tapered surface in conformity with the configuration of the inner peripheral surface of the bearing member 57 so as to be of small diameter on one axial side and of large diameter on the other axial side.

In a part of the axial region of the outer peripheral surface of the truncated-cone portion 62a constituting the master 62, there is formed a shaping portion N1 for shaping the electroformed portion 60 of the bearing member 57. The shaping portion N1 is of a configuration in which the asperity pattern of the inner peripheral surface of the electroformed portion 60 is reversed, and at two axial positions thereof, there are circumferentially formed rows of recesses Ka for forming the ridge portions between the dynamic pressure grooves Ca. Of course, the recesses Ka may also be formed in a spiral configuration, etc. in correspondence with the dynamic pressure groove pattern.

In the masking step shown in FIG. 19B, masking 63 (indicated by dot pattern) is provided on the outer surface of the master 62 except for the shaping portion N1. As the coating material of the masking 63, an existing product exhibiting non-conductivity and corrosion resistance with respect to electrolyte solutions is selected and used as appropriate.

In performing the electroforming, the master 62 is immersed in an electrolyte solution containing metal ions such as Ni or Cu, and then electricity is supplied to the master 62 to thereby deposit (electrodeposit) the intended metal on the region (shaping portion N1) of the outer peripheral surface of the master 62 where no masking 63 is provided. The electrolyte solution may contain a sliding material such as carbon, or a stress mitigating material such as saccharin, as needed. The kind of the metal for electroforming is selected as appropriate according to the hardness required of the bearing surface of the dynamic pressure bearing, the requisite physical properties such as fatigue strength, and the requisite chemical properties.

Through the above-mentioned steps, there is formed, as shown in FIG. 20, an electroforming member 64 in which the shaping portion N1 of the master 62 is coated with the electroformed portion 60 and in which the electroformed portion 60 and the master 62 are integrated with each other. In this case, the inner peripheral surface of the electroformed portion 60 is formed as a tapered surface corresponding to the configuration of the outer peripheral surface of the truncated-cone portion 62a of the master 62, and the asperity pattern of the shaping portion N1 formed on the master 62 is transferred thereto. As a result, as shown in FIG. 16, two inclined bearing surfaces C having a plurality of dynamic pressure grooves Ca are formed on the inner peripheral surface of the electroformed portion 60 so as to be vertically spaced apart from each other. When the electroformed portion 60 is too thick, a deterioration in its releasing property with respect to the master 62 is involved; on the other hand, when it is too thin, the durability of the electroformed portion 60 results in decreasing. Thus, it is set to an optimum thickness according to the requisite bearing performance, bearing size, use, etc.

Apart from the above-mentioned method based on electrolytic plating, the electroformed portion 60 can also be formed by a method based on non-electrolytic plating. In this case, there is no need for the conductivity of the master 62 and the insulation property of the masking 63; instead, corrosion resistance is required.

Next, the electroforming member 64 formed by the above-mentioned steps is transferred to the molding step, in which the bearing member 57 is formed by insert molding.

FIG. 21 is a conceptual drawing illustrating the molding step; in the molding step, the electroforming member 64 is supplied into a mold composed, for example, of an upper die 65 and a lower die 66, with its axial direction being parallel to the clamping direction (vertical direction in the drawing). In the lower die 66, there is formed a positioning hole 68 in conformity with the outer diameter dimension of a cylindrical portion 62b constituting the master 62, and the electroforming member 64 transferred from the foregoing step is inserted into the positioning hole 68 to set the electroforming member 64 in position. In the upper die 65, there is formed, coaxially with the positioning hole 68, a guide hole 70 into which the upper end portion of the master 62 can be fitted.

In the above-mentioned mold, when the movable die (upper die 65 in this embodiment) is brought close to the stationary die (lower die 66 in this embodiment), the master 62 is guided to a predetermined position in the upper die 65 by the guide hole 70, and then clamping is effected. After the completion of the clamping, a resin material is injected into a cavity 67 through gates 69 to effect insert molding. It does not matter whether the base resin constituting the resin material injected is amorphous or crystalline as long as the base resin allows injection molding. Examples of the amorphous resin include a polysulfone (PSU), a polyether sulfone (PES), a polyphenyl sulfone (PPSU), and a polyether imide (PEI); examples of the crystalline resin include a liquid crystal polymer (LCP), a polyetheretherketone (PEEK), a polybutyrene terephthalate (PBT), and a polyphenylene sulfide (PPS). One or two or more kinds of fillers selected from various fillers such as a reinforcing material (in any form of fibers, powder, etc.), a lubricant, and a conductive material, are mixed with the resin material as needed.

It is also possible to use a metal material as the material injected. Examples of the metal material that can be used include low-melting metal materials such as a magnesium alloy and an aluminum alloy. In this case, it is possible to achieve an improvement in terms of strength, heat resistance, conductivity, etc. as compared with the case in which a resin material is used. Apart from this, it is also possible to adopt so-called MIM molding, in which, after injection molding using a mixture of metal powder and binder, degreasing and sintering are effected. Further, it is also possible to use a ceramic material as the material injected.

After the completion of the insert molding, the mold is opened; then, there is obtained a molded product in which the electroforming member 64, composed of the master 62 and the electroformed portion 60, and the molded portion 61 are integrated with each other.

After that, this molded product is transferred to the separating step, where it is separated into the integral unit composed of the electroformed portion 60 and the molded portion 61 (bearing member 57), and the master 62. As in the above-mentioned example, in this separating step, the separation of the two components is effected by imparting an impact to, for example, the electroforming member 64 (master 62) or the bearing member 57 to increase the diameter of the inner peripheral surface of the electroformed portion 60 is increased in diameter. This makes it possible to pull out the master 62 smoothly in the axial direction from the inner peripheral surface of the electroformed portion 60 while avoiding excessive interference between the dynamic pressure groove patterns formed on the inner peripheral surface of the electroformed portion 60 and the shaping portion N1 formed on the outer peripheral surface of the master 62. When it is impossible to sufficiently increase the diameter of the inner periphery of the electroformed portion solely by imparting an impact, it is possible, as in the above-mentioned example, to separate the molded product into the bearing member 57 and the master 62 by heating or cooling the electroformed portion 60 and the master 62 to thereby generate therebetween a difference in thermal expansion amount.

Due to the characteristics of electroforming, the outer peripheral surface of the electroformed portion 60 is formed as a rough surface, so, during the insert molding, the resin material forming the molded portion 61 enters the fine asperities of the outer peripheral surface of the electroformed portion 60, thereby exerting a strong fixing force due to an anchoring effect. Further, since the electroformed portion 60 is formed so as to be inclined with respect to the axial direction, detachment prevention is effected at least in one axial direction. Thus, it is possible to provide a high strength bearing member 57 exhibiting a high level of impact resistance.

Then, the shaft member 52 produced separately is inserted into the inner periphery of the bearing member 57 formed by the above-mentioned steps; further, the inner space of the bearing member 57 is filled with lubricating oil, with the large diameter side opening of the bearing member 57 being sealed by the cover member 58, whereby the fluid dynamic bearing device 51 as shown in FIG. 15 is obtained. The master 62 separated from the electroformed portion 60 can be repeatedly used for the production of bearing members 57.

As described above, in the present invention, the bearing member 57 is formed by the electroformed portion 60 facing the inclined bearing gaps C1, and the molded portion 61 formed by injection molding with the electroformed portion 60 inserted. Due to the characteristics of electroforming, the configuration of the inner peripheral surface of the electroformed portion 60 is in conformity with the surface configuration of the master 62, and the precision of the inner peripheral surface of the electroformed portion 60 is in conformity with the surface precision of the master 62. Thus, by forming the master 62 in a predetermined configuration and with predetermined precision, the inner peripheral surface of the electroformed portion 60 is formed with high precision in conformity with the configuration of the master 62, so it is possible to form with high precision and at low cost a conical inner peripheral surface, which has been difficult to form with high precision by the conventional methods. As a result, it is possible to enhance the width precision of the inclined bearing gaps C1, thereby making it possible to improve the bearing performance of a fluid dynamic bearing device having an inclined bearing gap of this type. Further, when, as in this embodiment, the inclined bearing surfaces C having the dynamic pressure grooves Ca are formed by electroforming, it is possible to form the dynamic pressure grooves with high precision due to the characteristics of electroforming, so, from this viewpoint also, it is possible to achieve an improvement in the bearing performance of a fluid dynamic bearing device.

It is possible to adopt another method as the method of forming the dynamic pressure grooves Ca in the inner peripheral surface of the electroformed portion 60. FIGS. 22A through 22D show an example thereof, in which electroforming is performed with a projecting conductive film 72 corresponding to the configuration of the dynamic pressure grooves Ca being formed on the shaping portion N1 on the surface of the master 62. Then, the conductive film 72 is removed to thereby form the dynamic pressure grooves Ca.

Figure 22A:
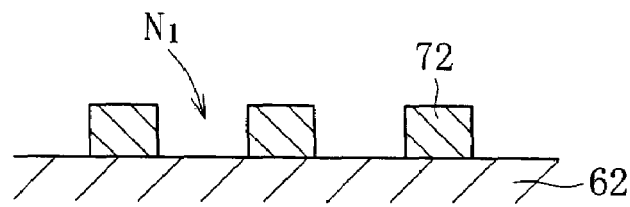
FIGS. 22A through 22D are sectional views showing steps taken when forming dynamic pressure grooves by some other method.
Figure 22B:
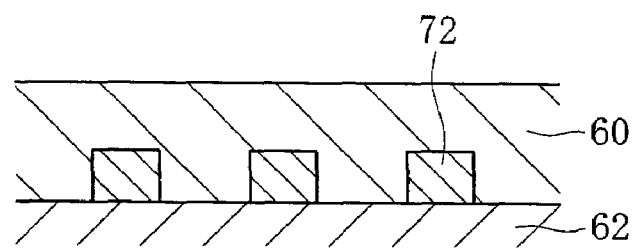
Figure 22C:
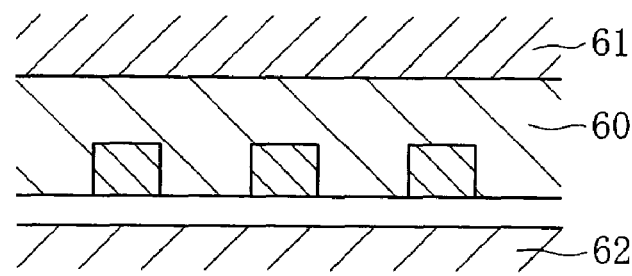
Figure 22D:
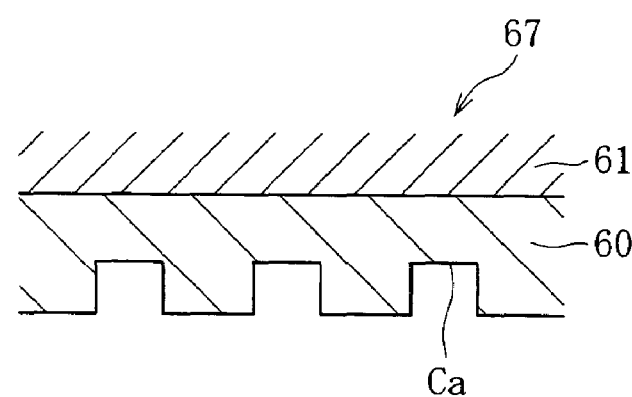

More specifically, first, as shown in FIG. 22A, the shaping portion N1 is formed in a partial region of the outer peripheral surface of the master 62, and a projecting conductive film 72 corresponding to the dynamic groove pattern is formed on the shaping portion N1. The conductive film 72 can be formed with high precision by, for example, effecting inkjet printing on the surface of the master 62 with a conductive resin. Then, as shown in FIG. 22B, electroforming is conducted by using the master 62, forming the electroformed portion 60 to which the configuration of the shaping portion N1 is transferred. After the completion of the electroforming, the molded portion 61 is formed by injection molding as in the above-mentioned process, and further, the master 62 is separated from the molded product as shown in FIG. 22C. In this process, the conductive film 72 is separated from the surface of the master 62 together with the electroformed portion 60. After that, as shown in FIG. 22D, by removing the conductive film 72 on the inner peripheral surface of the electroformed portion 60 by using solvent or the like, there is obtained the bearing member 57, in which the dynamic pressure grooves Ca are formed in the inner peripheral surface of the electroformed portion 60. When forming the bearing member 57 in this manner, it is possible to use the master 62 separated from the electroformed portion 60 as it is as the shaft member 52. By using the master 62 as it is as the shaft member 52, it is possible to more easily enhance the width precision of the inclined bearing gaps C1 as compared with the above-mentioned construction.

While in the above-mentioned example the inclined bearing surfaces C having the dynamic pressure grooves Ca are formed on the inner peripheral surface of the electroformed portion 60, it is also possible to form the inclined bearing surfaces C having the dynamic pressure grooves Ca on the outer peripheral surface of the shaft member 52. The fluid dynamic bearing device 51 of this type can be assembled by performing electroforming by using the master 62 whose outer peripheral surface is formed as a smooth surface with no asperities, forming the bearing member 57 whose inner peripheral surface is smooth through the molding step and the separating step, forming, apart from this, the inclined bearing surfaces C having the dynamic pressure grooves Ca on the outer peripheral surface of the shaft member 52, and inserting the shaft member 52 into the inner periphery of the bearing member 57. In this case, the inclined bearing surfaces C on the outer peripheral surface of the shaft member 52 can be formed by plastic deformation such as forging or rolling, or by such means as etching or inkjet printing.

While in the above-mentioned example there is used the inclined bearing gap C1 which is of small diameter on the upper side and of large diameter on the lower side, it is also possible for the inclined bearing gap to be inclined in the reverse direction, that is, to be inclined so as to be of large diameter on the upper side and of small diameter on the lower side.

Figure 23A:
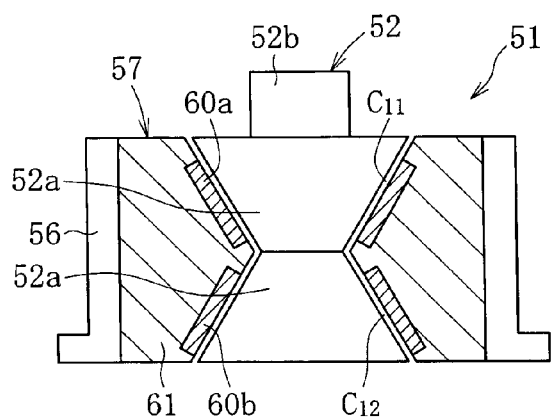
FIG. 23A is a sectional view of a second embodiment of the fluid dynamic bearing device helping to achieve the second object of the present invention.
Figure 23B:
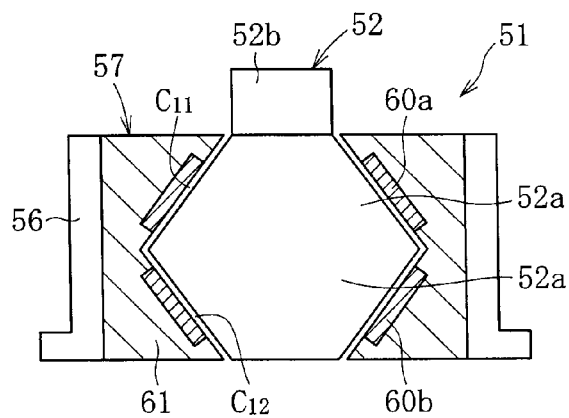
FIG. 23B is a sectional view of a third embodiment of the fluid dynamic bearing device helping to achieve the second object of the present invention.

FIGS. 23A and 23B show another embodiment of the fluid dynamic bearing device helping to achieve the second object of the present invention; this embodiment corresponds to the construction shown in FIG. 15, in which two fluid dynamic bearing devices 51 are arranged side by side in the axial direction.

In each fluid dynamic bearing device 51, the shaft member 52 has two conical portions 52a integrated with each other, and the bearing member 57 is equipped with two electroformed portions 60a and 60b opposed to the outer respective outer peripheral surfaces of the conical portions 52a and the molded portion 61 molded integrally with the electroformed portions 60a and 60b. During rotation of the shaft member 52, there are formed, between the outer peripheral surfaces of the two conical portions 52a and the inner peripheral surfaces 60a and 60b opposed thereto, two kinds of bearing gaps C11 and C12 inclined in the reverse direction, and by virtue of a dynamic pressure action of the lubricating oil generated in the inclined bearing gaps C11 and C12, the shaft member 52 is supported in a non-contact fashion radially and in both thrust directions. FIG. 23A shows an example in which the two kinds of inclined bearing gaps C11 and C12 of different inclining directions are arranged so as to be of smaller diameter on the side where they are close to each other, and FIG. 23B shows an example in which, conversely, the two inclined bearing gaps are arranged so as to be of larger diameter on the side where they are close to each other.

In both fluid dynamic bearing devices 51, seal spaces are formed between the outer peripheral surfaces of the upper and lower conical portions 52a and the inner peripheral surfaces of the upper and lower end portions of the bearing member 57, whereby leakage of the lubricating oil is prevented (it is also possible to form the seal spaces of seal members separate from the bearing member 58). In this case, the cover member 58 is unnecessary. Further, in both fluid dynamic bearing devices 51, thrust support forces in both directions are generated by virtue of the inclined bearing gaps C11 and C12, so there is no need to provide any other thrust bearing gap (e.g., thrust bearing gap C2 formed between upper end surface 58a of cover member 58 and lower end surface 52a2 of shaft member 52 opposed thereto in the embodiment shown in FIG. 15).

In both of the constructions shown in FIGS. 23A and 23B, the shaping portion N1 formed of the conductive film 72 is formed on the outer peripheral surface of the master 62 by a method based on the one as illustrated in FIGS. 22A through 22D, and then the electroforming step, the molding step, and the separating step are conducted, whereby it is possible to form the dynamic pressure grooves Ca in the inner peripheral surfaces of the electroformed portions 60a and 60b. In this case, as in the above-mentioned example, after the separation from each other of the master 62 and the electroformed portions 60a and 60b, the master 62 can be used as it is as the shaft member 52.

Apart from this, it is also possible to assemble the fluid dynamic bearing device 51 as shown in FIGS. 23A and 23B by individually producing divisional members obtained by dividing into two each of the bearing member 57 and the shaft member 52, and then integrally joining the divisional members with each other. Possible examples of the method of joining together the divisional members of the shaft member 52 include adhesion, and those of the method of joining together the divisional members of the bearing member 57 include adhesion and fusion-welding (ultrasonic welding or the like).

Figure 24:
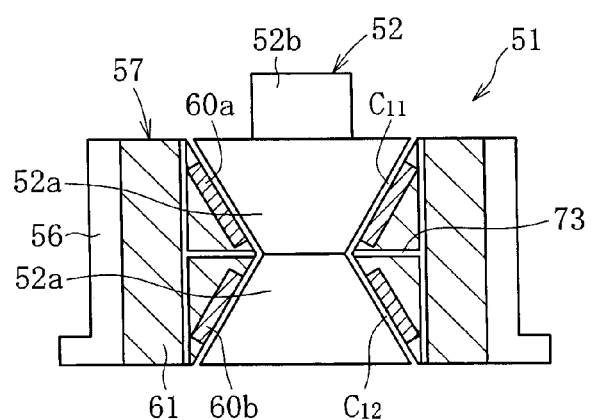
FIG. 24 is a sectional view of the fluid dynamic bearing device shown in FIG. 23A with a circulation path provided therein.
Figure 25:
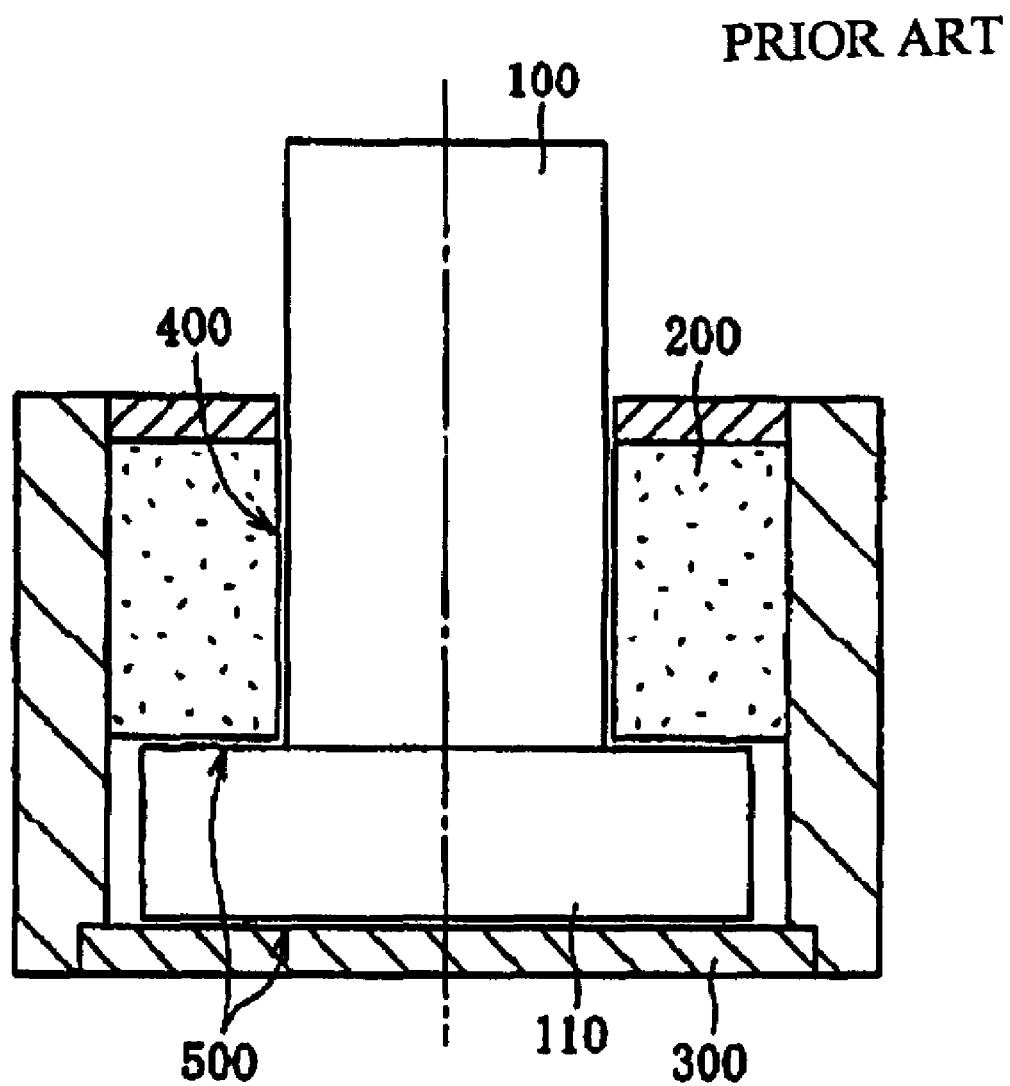
FIG. 25 is a schematic view of the construction of a conventional fluid dynamic bearing device.

FIG. 24 shows a modification in which, in the construction shown in FIG. 23A, to eliminate the unbalance in pumping amount generated in the two inclined bearing gaps C11 and C12, the bent portion at the axial center, in particular, of the annular gap (inclined bearing gap) between the outer peripheral surface of the shaft member 52 and the inner peripheral surface of the bearing member 57, is allowed to communicate with the exterior of the bearing member 57 through a circulation path 73. Although not shown, in the construction shown in FIG. 23B also, the circulation path 73 can be formed in similar fashion.

While in the example of the construction described above fluid dynamic pressure is generated by dynamic pressure grooves of a herringbone configuration or a spiral configuration formed in the inclined bearing portions K1 and K2 and the thrust bearing portion T, this should not be construed restrictively. For example, as the inclined bearing portions K1 and K2, it is also possible to adopt multi-arc bearings, step bearings, or non-cylindrical bearings as shown in FIGS. 9 through 13. In those bearings, a plurality of arcuate surfaces, axial grooves, or harmonic waveform surfaces constitute the dynamic pressure generating portions for generating dynamic pressure in the inclined bearing gaps. Of course, those dynamic pressure generating portions can be formed not only in the inner peripheral surface of the bearing member 57 but also in the outer peripheral surface 52a1 of the shaft member 52. The forming method for and the construction of dynamic pressure generating portions are the same as those described above, so a detailed description and graphical representation thereof will be omitted.

When adopting a multi-arc bearing as each of the inclined bearing portions K1 and K2, it is possible to adopt a three-arc bearing, a four-arc bearing, a five-arc bearing, and a multi-arc bearing formed of six or more arcuate surfaces. When adopting a non-cylindrical bearing, it is possible to adopt a non-cylindrical bearing formed of three or four or more harmonic waveform surfaces.

In the embodiment shown in FIG. 15, when forming the inclined bearing portion by a multi-arc bearing, a step bearing, or a non-cylindrical bearing, it is possible to adopt, apart from the construction in which two inclined bearing portions are provided so as to be axially spaced apart from each other as in a case of the inclined bearing portions K1 and K2, a construction in which there is provided a single inclined bearing portion extending over the vertical region of the inner peripheral surface of the bearing member 57 or of the outer peripheral surface of the shaft member 2.

Further, it is also possible to form the thrust bearing portion T by a so-called step bearing, a so-called corrugated bearing (with corrugated step form), etc., in which a plurality of dynamic pressure grooves in the form of radial grooves are provided in the region to be the thrust bearing surface at predetermined circumferential intervals (not shown).

While in the above-mentioned example each of the inclined bearing portions K1 and K2 is formed by a dynamic pressure bearing, it is also possible to form it by some other type of bearing. For example, although not shown, it is also possible to form the inner peripheral surface of the bearing member 57 (electroformed portion 60) as a cylindrical inner peripheral surface having no dynamic pressure grooves, arcuate surfaces, etc., and to form the outer peripheral surface 52a1 of the shaft member 52, opposed to this inner peripheral surface through the intermediation of the inclined bearing gap, as a cylindrical outer peripheral surface, thus forming a so-called cylindrical bearing. When thus forming the inclined bearing portions K1 and K2 by cylindrical bearings, the master 62 used to form the electroformed portion 60 is repeatedly used for electroforming; further, as in a case in which the dynamic pressure grooves Ca are formed by removing the conductive film 72, the master 62 may be used as it is as the shaft member 52.

While in the fluid dynamic bearing devices 1 and 51 described above lubricating oil is used as the lubricating fluid filling the inner space thereof, it is also possible to use some other fluid capable of generating dynamic pressure in each dynamic pressure groove, for example, a magnetic fluid, or a gas such as air.

What is claimed is:

1. A fluid dynamic bearing device, comprising:
   a shaft member;
   a cylindrical radial bearing surface forming a radial bearing gap with an outer peripheral surface of the shaft member;
   a bearing member formed by injection molding with an electroformed portion inserted, the electroformed portion having the radial bearing surface; and
   a thrust bearing portion equipped with a thrust bearing surface formed on an end surface of the bearing member and a thrust bearing gap facing the thrust bearing surface, wherein the shaft member is supported in a thrust direction by a dynamic pressure action of a lubricating fluid generated in the thrust bearing gap,
   wherein the electroformed portion is provided at the radial bearing surface thereof with a dynamic pressure generating portion for generating fluid pressure in the radial bearing gap, the dynamic pressure generating portion being formed by depositing a metal on a mold having a protrusion and a recess corresponding to the configuration of the dynamic pressure generating portion and separating the metal from the mold.

2. A fluid dynamic bearing device according to claim 1, wherein:
   the shaft member is provided with a flange portion; and
   the thrust bearing gap is formed between an end surface of the flange portion and the thrust bearing surface.

3. A fluid dynamic bearing device according to claim 1, wherein:
   the shaft member is provided with a step surface; and
   the thrust bearing gap is formed between the step surface and the thrust bearing surface.

4. A fluid dynamic bearing device according to claim 1, wherein there is formed, on the thrust bearing surface of the bearing member, a dynamic pressure generating portion for generating fluid pressure in the thrust bearing gap.

5. A fluid dynamic bearing device according to claim 1, wherein the electroformed portions are composed of a radial electroformed portion having the radial bearing surface and one of a thrust electroformed portion integral with the radial electroformed portion and a thrust electroformed portion separate from the radial electroformed portion and having the thrust bearing surface.

6. A fluid dynamic bearing device, comprising:
   a shaft member;
   a bearing member into an inner periphery of which the shaft member is inserted; and
   an inclined bearing gap formed between an outer peripheral surface of the shaft member and an inner peripheral surface of the bearing member and axially inclined, with the shaft member being rotatably supported by a fluid film formed in the inclined bearing gap,
   wherein the bearing member is provided with an electroformed portion facing the inclined bearing gap and is formed by injection molding with the electroformed portion inserted, and
   the electroformed portion is provided with a dynamic pressure generating portion for generating fluid pressure in the inclined bearing gap, the dynamic pressure generating portion being formed by depositing a metal on a mold having a protrusion and a recess corresponding to the configuration of the dynamic pressure generating portion and separating the metal from the mold.

7. A motor, comprising:
   a fluid dynamic bearing device according to any one of claims 1-6;
   a stator coil; and
   a rotor magnet.

* * * * *

UNITED STATES PATENT AND TRADEMARK OFFICE
CERTIFICATE OF CORRECTION

PATENT NO. : 7,687,951 B2  Page 1 of 1
APPLICATION NO. : 11/660739
DATED : March 30, 2010
INVENTOR(S) : Isao Komori et al.

It is certified that error appears in the above-identified patent and that said Letters Patent is hereby corrected as shown below:

On the Cover Page:
Change Item "(86) PCT No.: PCT/JP2006/012430" to be --(86) PCT No.: PCT/JP2006/312430--

Signed and Sealed this

Twenty-fifth Day of May, 2010

David J. Kappos
*Director of the United States Patent and Trademark Office*